US012713396B2

(12) United States Patent
Wang et al.

(10) Patent No.: US 12,713,396 B2
(45) Date of Patent: Aug. 18, 2026

(54) COMMUNICATION METHOD AND RELATED DEVICE

(71) Applicant: Huawei Technologies Co., Ltd., Shenzhen (CN)

(72) Inventors: Yan Wang, Beijing (CN); Baokun Shan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 557 days.

(21) Appl. No.: 18/164,243

(22) Filed: Feb. 3, 2023

(65) Prior Publication Data

US 2024/0049175 A1 Feb. 8, 2024

Related U.S. Application Data

(63) Continuation of application No. PCT/CN2020/107233, filed on Aug. 5, 2020.

(51) Int. Cl.

*H04W 68/02* (2009.01)
*H04W 52/02* (2009.01)
*H04W 76/30* (2018.01)

(52) U.S. Cl.

CPC ....... *H04W 68/02* (2013.01); *H04W 52/0229* (2013.01); *H04W 76/30* (2018.02)

(58) Field of Classification Search

CPC .. H04W 68/02; H04W 76/30; H04W 52/0229

(Continued)

(56) References Cited

U.S. PATENT DOCUMENTS

| | | | | |
|---|---|---|---|---|
| 2009/0137265 A1* | 5/2009 | Flore | .................... | H04W 40/248<br>455/525 |
| 2009/0190550 A1* | 7/2009 | Giustina | ............... | H04W 88/08<br>370/331 |

(Continued)

FOREIGN PATENT DOCUMENTS

| | | |
|---|---|---|
| CN | 101132260 A | 2/2008 |
| CN | 106717081 A | 5/2017 |

(Continued)

OTHER PUBLICATIONS

3GPP TS 23.401 V16.7.0 (Jul. 2020), 3rd Generation Partnership Project; Technical Specification Group Services and System Aspects; General Packet Radio Service (GPRS) enhancements for Evolved Universal Terrestrial Radio Access Network(E-UTRAN) access (Release 16), 440 pages.

(Continued)

*Primary Examiner* — Mark G. Pannell
(74) *Attorney, Agent, or Firm* — Slater Matsil, LLP

(57) ABSTRACT

Embodiments of this application provide a communication method and a related device. The method includes: sending, by an access network node, a first message to a terminal; receiving, by the terminal, the first message from the access network node; processing, by the terminal, first information based on the first message, where the first information includes information that needs to be stored in the terminal and a core network node; and/or processing first data based on the first message, where the first data includes data sent to the access network node before the first message from the access network node is received. By using embodiments of this application, a terminal receives paging from a last cell that served the terminal stored in the terminal, and it is ensured that data sent by the terminal to a network side can be successfully sent.

20 Claims, 14 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2010/0136969 | A1* | 6/2010 | Nader | H04W 48/16 455/434 |
| 2010/0317352 | A1* | 12/2010 | Nakata | H04W 48/18 455/445 |
| 2015/0312813 | A1* | 10/2015 | Xu | H04W 36/0058 455/438 |
| 2017/0012882 | A1* | 1/2017 | Tsai | H04W 48/16 |
| 2017/0223581 | A1 | 8/2017 | A et al. | |
| 2019/0306740 | A1* | 10/2019 | Kim | H04W 24/10 |
| 2020/0236559 | A1* | 7/2020 | Spiotta | H04W 16/18 |
| 2020/0280919 | A1* | 9/2020 | Hoglund | H04W 76/28 |
| 2020/0280959 | A1* | 9/2020 | Sharma | H04W 52/0219 |
| 2021/0029569 | A1* | 1/2021 | Kim | H04W 76/27 |
| 2021/0068072 | A1 | 3/2021 | Han et al. | |
| 2022/0104170 | A1* | 3/2022 | Liberg | H04W 68/005 |
| 2022/0141798 | A1* | 5/2022 | Åström | H04W 56/001 455/458 |
| 2022/0159528 | A1* | 5/2022 | Tran | H04L 5/0035 |
| 2022/0361275 | A1* | 11/2022 | Da Silva | H04W 76/18 |
| 2023/0030443 | A1* | 2/2023 | Chen | H04W 76/38 |
| 2023/0092687 | A1* | 3/2023 | Berggren | H04W 52/0229 370/329 |
| 2023/0254769 | A1* | 8/2023 | Shi | H04W 68/005 370/311 |
| 2023/0262504 | A1* | 8/2023 | Jung | H04W 24/10 370/329 |
| 2024/0397482 | A1* | 11/2024 | Nagano | H04W 68/025 |

FOREIGN PATENT DOCUMENTS

| | | | |
|---|---|---|---|
| CN | 109451546 | A | 3/2019 |
| CN | 110999522 | A | 4/2020 |
| WO | 2019135418 | A1 | 7/2019 |
| WO | 2020154622 | A1 | 7/2020 |
| WO | 2021114054 | A1 | 6/2021 |

OTHER PUBLICATIONS

3GPP TS 24.301 V16.5.1 (Jul. 2020), "3rd Generation Partnership Project; Technical Specification Group Core Network and Terminals; Non-Access-Stratum (NAS) protocol for Evolved Packet System (EPS); Stage 3 (Release 16)," 584 pages.

3GPP TS 24.501 V16.5.1 (Jul. 2020), 3rd Generation Partnership Project; Technical Specification Group Core Network and Terminals; Non-Access-Stratum (NAS) protocol for 5G System (5GS); Stage 3; (Release 16), 708 pages.

3GPP TS 36.300 V15.10.0 (Jul. 2020), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 365 pages.

3GPP TS 36.304 V15.6.0 (Jul. 2020), "3rd Generation Partnership Project; Technical Specification Group Radio Access Network; Evolved Universal Terrestrial Radio Access (E-UTRA); User Equipment (UE) procedures in idle mode (Release 15)" 55 pages.

3GPP TS 36.331 V16.1.1 (Jul. 2020), "3rd Generation Partnership Project; Technical Specification Group Radio Access Network; Evolved Universal Terrestrial Radio Access (E-UTRA); Radio Resource Control (RRC); Protocol specification (Release 16)," 1078 pages.

3GPP TS 36.413 V16.2.0 (Jul. 2020), "3rd Generation Partnership Project; Technical Specification Group Radio Access Network; Evolved Universal Terrestrial Radio Access Network (E-Utran); S1 Application Protocol (S1AP) (Release 16)," 422 pages.

3GPP TS 38.300 V15.10.0 (Jul. 2020), "3rd Generation Partnership Project; Technical Specification Group Radio Access Network; NR; NR and NG-RAN Overall Description; Stage 2 (Release 15)," 100 pages.

3GPP TS 38.304 V15.7.0 (Jul. 2020), 3rd Generation Partnership Project; Technical Specification Group Radio Access Network; NR; User Equipment (UE) procedures in Idle mode and RRC Inactive state (Release 15), 30 pages.

3GPP TS 38.331 V16.1.0 (Jul. 2020), 3rd Generation Partnership Project; Technical Specification Group Radio Access Network; NR; Radio Resource Control (RRC) protocol specification (Release 16), 906 pages.

3GPP TS 38.413 V16.2.0 (Jul. 2020), "3rd Generation Partnership Project; Technical Specification Group Radio Access Network; NG-RAN; NG Application Protocol (NGAP) (Release 16)," 462 pages.

3GPP TSG RAN WG2 Meeting #110-e, "LS on system support for WUS," R2-2005985, Jun. 1-12, 2020, 1 page.

3rd Generation Partnership Project; Technical Specification Group Radio Access Network; Evolved Universal Terrestrial Radio Access Network (E-UTRA) and Evolved Universal Terrestrial Radio Access Network (E-UTRAN); Overall Description; Stage 2: (Release 16), 3GPP TR 36.300, Jul. 2020, 390 Pages, V16.2.0.

* cited by examiner

COMMUNICATION METHOD AND RELATED DEVICE

CROSS-REFERENCE TO RELATED APPLICATIONS

This application is a continuation of International Application No. PCT/CN2020/107233, filed on Aug. 5, 2020, the disclosure of which is hereby incorporated by reference in its entirety.

TECHNICAL FIELD

This application relates to the field of communications technologies, and in particular, to a communication method and a related device.

BACKGROUND

In a scenario in which a wake up signal (WUS) is used to reduce power consumption of monitoring paging by user equipment (UE), the UE is required to monitor the WUS only in a last cell that served the UE, and when a network side pages the UE, the WUS is also used only when the UE is paged in the last cell that served the UE. In this solution, it is required that the UE receives paging from a base station only when information about a last cell that served the UE stored in the UE is consistent with information about a last cell that served the UE stored on the network side. However, for example, when a core network is overloaded (CN Overload) or in some scenarios, the base station triggers radio resource control release (RRC release) to release the UE from radio resource control, and the base station does not notify the core network of the access of the UE. As a result, the information about the last cell that served the UE stored in the UE is inconsistent with the information about the last cell that served the UE stored on the network side, and the UE cannot receive paging from the base station. In addition, when the core network is overloaded (CN Overload), the base station discards a protocol data unit NAS PDU (Non Access Stratum Protocol Data Unit) or user plane data sent by the UE to the base station.

SUMMARY

Disclosed in embodiments of this application are a communication method and a related device, so that information about a last cell that served a terminal stored in the terminal can be kept consistent with information about a last cell that served the terminal stored on a network side. This helps the terminal receive paging in the last cell that served the terminal stored in the terminal, and helps ensure that data sent by the terminal to the network side can be successfully sent.

Disclosed in a first aspect of embodiments of this application is a communication method, applied to a terminal, the method including: receiving a first message from an access network node; and processing first information based on the first message, where the first information includes information that needs to be stored in the terminal and a core network node; and/or processing first data based on the first message, where the first data includes data sent to the access network node before the first message from the access network node is received.

It can be learned that, in this embodiment, the terminal receives the first message from the access network node, and then the terminal processes the first information based on the first message. Because the first information includes the information that needs to be stored in the terminal and the core network node, when the first information is information about a last cell that served the terminal, the terminal processes the information about the last cell that served the terminal stored in the terminal, so that the information about the last cell that served the terminal stored in the terminal is consistent with the information about the last cell that served the terminal stored in the core network node, which helps the terminal monitor a wake up signal in the last cell that served the terminal stored in the terminal, and then receive paging based on the wake up signal; or the terminal processes the first data based on the first message. Because the first data includes the data sent to the access network node before the first message from the access network node is received, if the first data is not successfully sent, the terminal may retransmit the first data to the access network node based on the first message, thereby ensuring that the first data can be successfully sent.

In an example implementation, the first message includes first indication information, and the first indication information indicates at least one of the following: radio resource control connection reject; radio resource control connection failure; radio resource control connection release; no radio resource control connection is established; no connection to the core network node is established; the core network node is unaware of current access of the terminal; access failure; access reject; and the access network node does not send the first data to the core network node.

It can be learned that in this implementation, the first message includes the first indication information, and the first indication information indicates at least one of the following: the radio resource control connection reject; the radio resource control connection failure; the radio resource control connection release; no radio resource control connection is established; no connection to the core network node is established; the core network node is unaware of the current access of the terminal; the access failure; the access reject; and the access network node does not send the first data to the core network node. Therefore, after receiving the first message, the terminal may learn that the data sent to the access network node before the first message is received is not sent to the core network node. The first data may be a non-access stratum protocol data unit NAS PDU (Non Access Stratum Protocol Data Unit) or user plane data.

In an example implementation, the processing first data includes retransmitting the first data.

It can be learned that in this implementation, when the first data sent by the terminal to the access network node is not sent to the core network node, the terminal may retransmit the first data during next access based on the first indication information in the first message. This helps ensure that the first data can be sent to the core network node.

In an example implementation, the first information includes information about a last cell that served the terminal. The information about the cell may be a physical cell identifier, a global cell identifier, a cell identifier, a cell frequency, or a cell index number of the cell.

It can be learned that, in this implementation, the first information includes the information about the last cell that served the terminal. After the terminal receives the first message from the access network node, the terminal learns, by using the first indication information, that the core network node is unaware of the current access of the terminal to the core network node. Therefore, the terminal processes, based on the first indication information, the information about the last cell that served the terminal stored in the terminal, so that the information about the last cell that served the terminal stored in the terminal is consistent with the information about the last cell that served the terminal stored in the core network node. It is beneficial for the terminal to monitor a wake up signal in the cell corresponding to the stored information about the last cell that served the terminal, and further receive paging based on the wake up signal.

In an example implementation, the processing first information includes: skipping updating the information about the last cell that served the terminal; or saving information about a cell of the access network node during last access of the terminal as the information about the last cell that served the terminal.

It can be learned that, in this implementation, the first information includes the information about the last cell that served the terminal. After the terminal receives the first message from the access network node, the terminal learns that the core network node is unaware of the current access of the terminal to the core network node. Therefore, the terminal does not update the stored information about the last cell that served the terminal or saves the information about the cell of the access network node during last access of the terminal as the information about the last cell that served the terminal, so that the information about the last cell that served the terminal stored in the terminal is consistent with the information about the last cell that served the terminal stored in the core network node. It is beneficial for the terminal to monitor a wake up signal in the cell corresponding to the stored information about the last cell that served the terminal, and further receive paging based on the wake up signal.

In an example implementation, after the processing first information based on the first message, the method further includes: if the terminal is located in the cell corresponding to the information about the last cell that served the terminal, monitoring a wake up signal, and receiving paging based on the wake up signal; and if the terminal is located in a first cell, skipping monitoring the wake up signal, where the first cell does not include the cell corresponding to the information about the last cell that served the terminal.

It can be learned that, in this implementation, if the terminal is located in the last cell that served the terminal stored in the terminal, the terminal monitors a wake up signal, and receives paging based on the wake up signal. If the terminal is located in another cell other than the last cell that served the terminal stored in the terminal, the terminal skips monitoring a wake up signal. The terminal monitors a wake up signal in the last cell that served the terminal stored in the terminal, and the terminal monitors paging only after detecting a wake up signal, thereby helping reduce paging monitoring overheads of the terminal.

In an example implementation, the first message includes a radio resource control release message.

It can be learned that, in this implementation, the access network node sends the radio resource control release message to the terminal, to indicate the terminal to release a radio resource control connection, so that the terminal learns that the core network node is unaware of the current access of the terminal to the core network node, and after the radio resource control connection is released, the terminal processes the information about the last cell that served the terminal stored in the terminal, for example, does not update the information about the last cell that served the terminal stored in the terminal, so that the information about the last cell that served the terminal stored in the terminal is consistent with the information about the last cell that served the terminal stored in the core network node.

In an example implementation, the first indication information includes a radio resource control release cause (RRC release cause).

It can be learned that, in this implementation, in a paging process, the core network node sends the information about the last cell that served the terminal that needs to be paged to the access network node, and then the access network node uses a wake up signal when initiating paging in the last cell that served the terminal. Therefore, if indication information in the radio resource control release message indicates that when radio resource control is released, the access network node does not report, to the core network node, information about a serving cell currently accessed by the terminal. In this case, to receive paging from the access network node, the terminal does not update the information about the last cell that served the terminal stored in the terminal, so that the information about the last cell that served the terminal stored on a terminal side is consistent with the information about the last cell that served the terminal stored on a core network node side.

In an example implementation, the method further includes: sending a second message to the access network node, where the second message includes second indication information, and the second indication information indicates whether the terminal supports only control plane cellular internet of things (CP CIoT) or whether the terminal supports user plane cellular internet of things (UP CIoT).

It can be learned that in this implementation, the terminal may send the second message to the access network node. The second message includes the second indication information, and the second indication information indicates whether the terminal supports cellular internet of things. Therefore, the access network node may learn, by using the second message, whether the terminal supports only control plane cellular internet of things or whether the terminal supports user plane cellular internet of things. When the core network node is overloaded, the core network node does not accept access of a terminal that supports only control plane cellular internet of things or does not support user plane cellular internet of things. Therefore, the access network node may determine, by using the second indication information in the second message, whether to accept access of the terminal.

In an example implementation, the receiving a first message from an access network node includes: if the core network node is overloaded and the terminal supports only control plane cellular internet of things or the terminal does not support user plane cellular internet of things, receiving the radio resource control release message from the access network node.

It can be learned that in this implementation, when the core network node is overloaded, the core network node does not accept access of a terminal that supports only control plane cellular internet of things or does not support user plane cellular internet of things. If the access network node knows that the terminal supports only control plane cellular internet of things or does not support user plane cellular internet of things, the access network node sends a radio resource control release message to the terminal, to reject access of the terminal.

Disclosed in a second aspect of embodiments of this application is a communication method, applied to an access network node. The method includes: sending a first message to a terminal, where the first message is used by the terminal to process first information, and the first information includes information that needs to be stored in the terminal and a core network node; and/or the first message is used by the terminal to process first data, and the first data includes data received from the terminal before the first message is sent to the terminal.

In an example implementation, the first message includes first indication information, and the first indication information indicates at least one of the following: radio resource control connection reject; radio resource control connection failure; radio resource control connection release; no radio resource control connection is established; no connection to the core network node is established; the core network node is unaware of current access of the terminal; access failure; access reject; and the access network node does not send the first data to the core network node.

In an example implementation, the processing first data includes retransmitting the first data.

In an example implementation, the first information includes information about a last cell that served the terminal.

In an example implementation, the processing first information includes: skipping updating the information about the last cell that served the terminal; or saving information about a cell of the access network node during last access of the terminal as the information about the last cell that served the terminal.

In an example implementation, after the sending a first message to a terminal, the method further includes: receiving a paging message from the core network node, where the paging message includes the information about the last cell that served the terminal; and using a wake up signal during paging of the terminal in the cell corresponding to the information about the last cell that served the terminal, and skipping using the wake up signal during paging of the terminal in a first cell, where the wake up signal is used for indicating the terminal to receive paging, and the first cell does not include the cell corresponding to the information about the last cell that served the terminal.

In an example implementation, the first message includes a radio resource control release message.

In an example implementation, the first indication information includes a radio resource control release cause.

In an example implementation, the method further includes: receiving an overload start message from the core network node, where the overload start message is used for indicating that access of a terminal that supports only control plane cellular internet of things is not accepted; and receiving a second message from the terminal, where the second message includes second indication information, and the second indication information indicates whether the terminal supports only control plane cellular internet of things or whether the terminal supports user plane cellular internet of things.

It can be learned that in this implementation, when the core network node is overloaded, the core network node may send the overload start message to the access network node, to indicate not to accept access of a terminal that supports only control plane cellular internet of things. In addition, the access network node may receive the second message from the terminal. The second message includes the second indication information, and the second indication information indicates whether the terminal supports only control plane cellular internet of things or whether the terminal supports user plane cellular internet of things. Therefore, the access network node may determine, by using the second indication information in the second message, whether to accept access of the terminal when the core network node is overloaded.

In an example implementation, the sending a first message to a terminal includes: if the terminal supports only control plane cellular internet of things or the terminal does not support user plane cellular internet of things, sending the radio resource control release message to the terminal.

Disclosed in a third aspect of embodiments of this application is a communication method, applied to an access network node. The method includes: sending a radio resource control release message to a terminal, and sending a first S1 interface application protocol (SLAP) message or a first NG interface application protocol (NGAP) message to a core network node, where the first S1 interface application protocol message or the first NG interface application protocol message includes information about a cell of the access network node during current access of the terminal.

It can be learned that, in this embodiment, the access network node sends the radio resource control release message to the terminal. After receiving the radio resource control release message, the terminal releases a radio resource control connection, and updates information about a last cell that served the terminal stored in the terminal, that is, saves the information about the cell of the access network node during current access of the terminal as the information about the last cell that served the terminal. In addition, the access network node further sends the information about the cell of the access network node during current access of the terminal to the core network node by using the first S1 interface application protocol message or the first NG interface application protocol message. In this way, the information about the last cell that served the terminal stored in the terminal is consistent with information about a last cell that served the terminal stored in the core network node. It is beneficial for the terminal to monitor a wake up signal in the last cell that served the terminal stored in the terminal, and further receive paging based on the wake up signal.

In an example implementation, the first S1 interface application protocol message or the first NG interface application protocol message does not establish or activate an S1 interface association or an NG interface association of the terminal.

It can be learned that in this implementation, the first S1 interface application protocol message or the first NG interface application protocol message does not establish or activate the S1 interface association or the NG interface association of the terminal. That is, when sending the first S1 interface application protocol message or the first NG interface application protocol message to the core network node, the access network node does not establish an S1 interface association or an NG interface association about the terminal between a core network and an access network, or does not activate the S1 interface association or the NG interface association about the terminal between the core network and the access network. Therefore, in this implementation, even if the S1 interface association or the NG interface association about the terminal is not established or activated between the core network and the access network, the access network node can still send, to the core network node, the information about the cell of the access network node during current access of the terminal.

In an example implementation, the method further includes: receiving an overload start message from the core network node, where the overload start message is used for indicating that access of a terminal that supports only control plane cellular internet of things is not accepted; and receiving a second message from the terminal, where the second message includes second indication information, and the second indication information indicates whether the terminal supports only control plane cellular internet of things or whether the terminal supports user plane cellular internet of things.

It can be learned that in this implementation, when the core network node is overloaded, the core network node may send the overload start message to the access network node, to indicate not to accept access of a terminal that supports only control plane cellular internet of things. In addition, the access network node may receive the second message from the terminal. The second message includes the second indication information, and the second indication information indicates whether the terminal supports only control plane cellular internet of things or whether the terminal supports user plane cellular internet of things. Therefore, the access network node may determine, by using the second indication information in the second message, whether to accept access of the terminal when the core network node is overloaded.

In an example implementation, the sending a radio resource control release message to a terminal, and sending a first S1 interface application protocol message or a first NG interface application protocol message to a core network node includes: if the terminal supports only control plane cellular internet of things or the terminal does not support user plane cellular internet of things, sending the radio resource control release message to the terminal, and sending the first S1 interface application protocol message or the first NG interface application protocol message to the core network node.

It can be learned that in this implementation, when the core network node is overloaded and the terminal supports only control plane cellular internet of things or the terminal does not support user plane cellular internet of things, the access network node sends the radio resource control release message to the terminal, to reject access of the terminal, so that the terminal releases the radio resource control connection, and saves the information about the cell of the access network node during current access of the terminal as the information about the last cell that served the terminal. The access network node sends the first S1 interface application protocol message or the first NG interface application protocol message to the core network node, to send, to the core network node for storage, the information about the cell of the access network node during current access of the terminal, so that the information about the last cell that served the terminal stored in the terminal is consistent with the information about the last cell that served the terminal stored in the core network node.

In an example implementation, the radio resource control release message includes first indication information, and the first indication information indicates at least one of the following: radio resource control connection reject; radio resource control connection failure; radio resource control connection release; no radio resource control connection is established; no connection to the core network node is established; the core network node is unaware of current access of the terminal; access failure; access reject; and the access network node does not send first data to the core network node, where the first data includes data sent by the terminal to the access network node.

It can be learned that in this implementation, the radio resource control release message includes the first indication information, and the first indication information indicates at least one of the following: the radio resource control connection reject; the radio resource control connection failure; the radio resource control connection release; no radio resource control connection is established; no connection to the core network node is established; the core network node is unaware of the current access of the terminal; the access failure; the access reject; and the access network node does not send the first data to the core network node. Therefore, after receiving the radio resource control release message, the terminal may learn that the data sent to the access network node before the radio resource control release message is received is not sent to the core network node.

In an example implementation, the first indication information is used by the terminal to process the first data, and the first data includes data received from the terminal before the radio resource control release message is sent to the terminal.

It can be learned that in this implementation, when the first data sent by the terminal to the access network node is not sent to the core network node, the terminal may retransmit the first data to the core network node based on the first message. This helps ensure that the first data can be sent to the core network node.

In an example implementation, the first S1 interface application protocol message or the first NG interface application protocol message further includes an identifier of the terminal.

It can be learned that, in this implementation, when sending the updated information about the last cell that served the terminal to the core network node, the access network node sends the identifier of the terminal to the core network node, and the core network node may associate and store the information about the last cell that served the terminal with the identifier of the terminal. When the terminal needs to be paged, the core network node may accurately send, to the access network node by using the stored identifier of the terminal, the information about the last cell that served the terminal, so that the access network node uses a wake up signal when initiating paging in the last cell that served the terminal, and the terminal successfully receives the paging of the access network node.

In an example implementation, the first S1 interface application protocol message or the first NG interface application protocol message includes retrieve UE information, such as Retrieve UE Information.

It can be learned that, in this implementation, the access network node sends the information about the last cell that served the terminal to the core network node by using an existing message (that is, Retrieve UE Information) in the S1 interface application protocol or the NG interface application protocol.

Disclosed in a fourth aspect of embodiments of this application is a communication method, applied to a core network node, the method including: receiving a first S1 interface application protocol message or a first NG interface application protocol message from an access network node, where the first S1 interface application protocol message or the first NG interface application protocol message includes information about a cell of the access network node during current access of a terminal, and the first S1 interface application protocol message or the first NG interface application protocol message does not establish or activate an S1 interface association or an NG interface association of the terminal; and storing the information about the cell of the access network node during current access of the terminal.

It can be learned that in this embodiment, the first S1 interface application protocol message or the first NG interface application protocol message does not establish or activate the S1 interface association or the NG interface association of the terminal. That is, when sending the first S1 interface application protocol message or the first NG interface application protocol message to the core network node, the access network node does not establish an S1 interface association or an NG interface association about the terminal between a core network and an access network, or does not activate the S1 interface association or the NG interface association about the terminal between the core network and the access network. Therefore, in this implementation, even if the S1 interface association or the NG interface association about the terminal is not established or activated between the core network and the access network, the access network node can still send, to the core network node, the information about the cell of the access network node during current access of the terminal.

Disclosed in a fifth aspect of embodiments of this application is a communication method, applied to an access network node, the method including: receiving a radio resource control connection request message from a terminal; sending a second S1 interface application protocol message or a second NG interface application protocol message to a core network node, where the second S1 interface application protocol message or the second NG interface application protocol message includes an identifier of the terminal; receiving a third S1 interface application protocol message or a third NG interface application protocol message from the core network node, where the third S1 interface application protocol message or the third NG interface application protocol message includes third indication information, and the third indication information indicates whether the terminal supports only control plane cellular internet of things or whether the terminal supports user plane cellular internet of things; and if the terminal supports only control plane cellular internet of things or the terminal does not support user plane cellular internet of things, sending a radio resource control connection reject message to the terminal.

It can be learned that in this embodiment, after receiving the radio resource control connection request message of the terminal, the access network node sends the second S1 interface application protocol message or the second NG interface application protocol message to the core network node, to notify the core network node of the identifier of the terminal. The core network node may determine, by using the identifier of the terminal, whether the terminal is a terminal that supports only control plane cellular internet of things or whether the terminal is a terminal that supports user plane cellular internet of things. Then, the core network node sends the third S1 interface application protocol message or the third NG interface application protocol message to the access network node, and notifies the access network node of a result of whether the terminal is a terminal that supports only control plane cellular internet of things or whether the terminal is a terminal that supports user plane cellular internet of things. If the terminal supports only control plane cellular internet of things or the terminal does not support user plane cellular internet of things, the access network node directly rejects the radio resource control connection request of the terminal. Because the radio resource control connection request initiated by the terminal is rejected, the terminal fails to access the network, and the terminal does not update the information of the last cell that served the terminal stored in the terminal. Therefore, the information about the last cell that served the terminal stored on a terminal side is consistent with the information about the last cell that served the terminal stored on a network side. It is beneficial for the terminal to monitor a wake up signal in the last cell that served the terminal stored in the terminal, and further receive paging based on the wake up signal.

In an example implementation, the method further includes: receiving an overload start message from the core network node, where the overload start message is used for indicating that access of a terminal that supports only control plane cellular internet of things is not accepted.

It can be learned that, in this implementation, when the core network node is overloaded, the core network node may send the overload start message to the access network node, to indicate that access of a terminal that supports only control plane cellular internet of things is not accepted. Therefore, when determining that the terminal supports only control plane cellular internet of things, the access network node sends a radio resource control connection reject message to the terminal to reject access of the terminal.

Disclosed in a sixth aspect of embodiments of this application is a communication method, applied to a core network node, the method including: receiving a second S1 interface application protocol message or a second NG interface application protocol message from an access network node, where the second S1 interface application protocol message or the second NG interface application protocol message includes an identifier of a terminal; and sending a third S1 interface application protocol message or a third NG interface application protocol message to the access network node, where the third S1 interface application protocol message or the third NG interface application protocol message includes third indication information, and the third indication information indicates whether the terminal supports only control plane cellular internet of things or whether the terminal supports user plane cellular internet of things.

It can be learned that in this embodiment, the access network sends the identifier of the terminal to the core network node by using the second S1 interface application protocol message or the second NG interface application protocol message. The core network node may notify, by using the third S1 interface application protocol message or the third NG interface application protocol message, the access network node whether the terminal supports only control plane cellular internet of things or whether the terminal supports user plane cellular internet of things.

In an example implementation, the second S1 interface application protocol message or the second NG interface application protocol message and the third S1 interface application protocol message or the third NG interface application protocol message do not establish or activate an S1 interface association or an NG interface association of the terminal.

It can be learned that, in this implementation, the second S1 interface application protocol message or the second NG interface application protocol message and the third S1 interface application protocol message or the third NG interface application protocol message do not establish or activate an S1 interface association or an NG interface association of the terminal. That is, when sending the second S1 interface application protocol message or the second NG interface application protocol message and the third S1 interface application protocol message or the third NG interface application protocol message to the core network node, the access network node does not establish the S1 interface association or the NG interface association about the terminal between a core network and an access network, or does not activate the S1 interface association or the NG interface association about the terminal between the core network and the access network. Therefore, in this implementation, even if the S1 interface association or the NG interface association about the terminal is not established or activated between the core network and the access network, the access network node can still send the identifier of the terminal to the core network node, and the core network node can still send, to the access network node, the third indication information indicating whether the terminal supports only control plane cellular internet of things or whether the terminal supports user plane cellular internet of things.

Disclosed in a seventh aspect of embodiments of this application is a communication method, applied to a terminal, the method including: sending first data to an access network node, so that the access network node does not send an application protocol message to a core network control plane node and sends the first data to a core network user plane node; and skipping updating stored information about a last cell that served the terminal.

It can be learned that in this embodiment, the terminal quickly accesses the access network node, and sends the first data to the access network node, so that the access network node does not send the application protocol message to the core network control plane node and sends the first data to the core network user plane node, thereby transmitting data to a core network. The access network node does not send the application protocol message to the core network control plane node, that is, the access network node does not send, to the core network control plane node, information about the cell that is quickly accessed by the terminal a current time. Therefore, the information about the last cell that served the terminal stored in the core network is still information about a cell that is accessed last time. Therefore, the terminal does not update the stored information about the last cell that served the terminal, that is, the terminal does not store the information about the cell that is quickly accessed the current time as the information about the last cell that served the terminal. Therefore, the information about the last cell that served the terminal stored on a terminal side is consistent with the information about the last cell that served the terminal stored on a network side. It is beneficial for the terminal to monitor a wake up signal in the last cell that served the terminal stored in the terminal, and further receive paging based on the wake up signal.

In an example implementation, before or during the sending first data to an access network node, the method further includes: triggering quick access to the access network node.

It can be learned that, in this implementation, before or during the sending first data to an access network node, the terminal triggers the quick access to the access network node, that is, the terminal quickly accesses the access network node, so that the first data is transmitted to the core network through quick access.

In an example implementation, the quick access includes small packet transmission, early data transmission, two-step random access, and resource reservation access.

It can be learned that, in this implementation, the quick access includes the small packet transmission, the early data transmission, the two-step random access, and the resource reservation access, so that the terminal may transmit the first data to the core network in a plurality of manners.

Disclosed in an eighth aspect of embodiments of this application is a communication apparatus, applied to a terminal, the apparatus including: a receiving unit, configured to receive a first message from an access network node; and a processing unit, configured to process first information based on the first message, where the first information includes information that needs to be stored in the terminal and a core network node; and/or process first data based on the first message, where the first data includes data sent to the access network node before the first message from the access network node is received.

Disclosed in a ninth aspect of embodiments of this application is a communication apparatus, applied to an access network node, the apparatus including: a sending unit, configured to send a first message to a terminal, where the first message is used by the terminal to process first information, and the first information includes information that needs to be stored in the terminal and a core network node; and/or the first message is used by the terminal to process first data, and the first data includes data received from the terminal before the first message is sent to the terminal.

Disclosed in a tenth aspect of embodiments of this application is a communication apparatus, applied to an access network node, the apparatus including: a sending unit, configured to send a radio resource control release message to a terminal, and send a first S1 interface application protocol message or a first NG interface application protocol message to a core network node, where the first S1 interface application protocol message or the first NG interface application protocol message includes information about a cell of the access network node during current access of the terminal.

Disclosed in an eleventh aspect of embodiments of this application is a communication apparatus, applied to a core network node, the apparatus including: a receiving unit, configured to receive a first S1 interface application protocol message or a first NG interface application protocol message from an access network node, where the first S1 interface application protocol message or the first NG interface application protocol message includes information about a cell of the access network node during current access of a terminal, and the first S1 interface application protocol message or the first NG interface application protocol message does not establish or activate an S1 interface association or an NG interface association of the terminal; and a storage unit, configured to store the information about the cell of the access network node during current access of the terminal.

Disclosed in a twelfth aspect of embodiments of this application is a communication apparatus, applied to an access network node, the apparatus including: a receiving unit, configured to receive a radio resource control connection request message from a terminal; and a sending unit, configured to send a second S1 interface application protocol message or a second NG interface application protocol message to a core network node, where the second S1 interface application protocol message or the second NG interface application protocol message includes an identifier of the terminal; the receiving unit being further configured to receive a third S1 interface application protocol message or a third NG interface application protocol message from the core network node, where the third S1 interface application protocol message or the third NG interface application protocol message includes third indication information, and the third indication information indicates whether the terminal supports only control plane cellular internet of things or whether the terminal supports user plane cellular internet of things; and the sending unit being further configured to: if the terminal supports only control plane cellular internet of things or the terminal does not support user plane cellular internet of things, send a radio resource control connection reject message to the terminal.

Disclosed in a thirteenth aspect of embodiments of this application is a communication apparatus, applied to a core network node, the apparatus including: a receiving unit, configured to receive a second S1 interface application protocol message or a second NG interface application protocol message from an access network node, where the second S1 interface application protocol message or the second NG interface application protocol message includes an identifier of a terminal; and a sending unit, configured to send a third S1 interface application protocol message or a third NG interface application protocol message to the access network node, where the third S1 interface application protocol message or the third NG interface application protocol message includes third indication information, and the third indication information indicates whether the terminal supports only control plane cellular internet of things or whether the terminal supports user plane cellular internet of things.

Disclosed in a fourteenth aspect of embodiments of this application is a communication apparatus, applied to a terminal, the apparatus including: a sending unit, configured to send first data to an access network node through quick access, so that the access network node does not send an application protocol message to a core network control plane node and sends the first data to a core network user plane node; and a processing unit, configured to skip updating stored information about a last cell that served the terminal.

Disclosed in a fifteenth aspect of embodiments of this application is a terminal, including a processor, a memory, a communication interface, and one or more programs, where the one or more programs are stored in the memory, and are configured to be executed by the processor, and the program includes instructions used for performing the steps in the method according to the foregoing first aspect or seventh aspect.

Disclosed in a sixteenth aspect of embodiments of this application is an access network node, including: a processor, a memory, a communication interface, and one or more programs, where the one or more programs are stored in the memory, and are configured to be executed by the processor, and the program includes instructions used for performing the steps in the method according to the foregoing second aspect, third aspect or fifth aspect.

Disclosed in a seventeenth aspect of embodiments of this application is a core network node, including: a processor, a memory, a communication interface, and one or more programs, where the one or more programs are stored in the memory, and are configured to be executed by the processor, and the program includes instructions used for performing the steps in the method according to the foregoing fourth aspect or sixth aspect.

Disclosed in an eighteenth aspect of embodiments of this application is a chip, including: a processor, configured to invoke a computer program from a memory and run the computer program, so that a device in which the chip is installed performs the method according to any one of the foregoing first aspect to seventh aspect.

Disclosed in a nineteenth aspect of embodiments of this application is a computer-readable storage medium, where the computer-readable storage medium stores a computer program used for electronic data interchange, and the computer program enables a computer to perform the method according to any one of the foregoing first aspect to seventh aspect.

Disclosed in a twentieth aspect of embodiments of this application is a computer program product, where the computer program product enables a computer to perform the method according to any one of the foregoing first aspect to seventh aspect.

DETAILED DESCRIPTION OF ILLUSTRATIVE EMBODIMENTS

Figure 1:
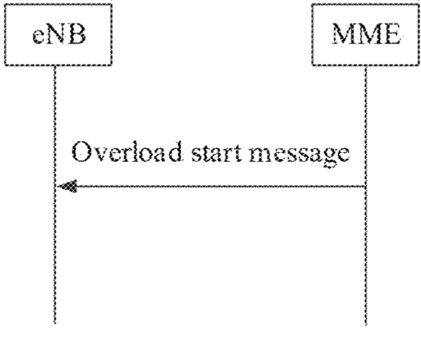
FIG. 1 is a schematic diagram of message sending according to an embodiment of this application.

To make the solutions of this application more comprehensible for a person skilled in the art, the technical solutions in embodiments of this application are clearly and completely described in the following with reference to the accompanying drawings in embodiments of this application. It is clearly that the embodiments in the following description are merely a part rather than all of embodiments of this application. All other embodiments obtained by a person of ordinary skill in the art based on embodiments of this application without creative efforts shall fall within the protection scope of this application.

The terms "include", "have", and any other variant thereof in the specification, claims, and the accompanying drawings of this application, are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device.

The "embodiment" mentioned in this specification means that specific features, structures or characteristics described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

The technical solutions in embodiments of this application may be applied to various communication systems, for example, a global system for mobile communications (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future 5th generation (5G) system, or a new radio (NR) system.

A terminal in embodiments of this application may be user equipment (UE), an access terminal, a subscriber unit, a subscriber station, a mobile station, a remote station, a remote terminal, a mobile device, a user terminal, a terminal, a wireless communication device, a user agent, or a user apparatus. The terminal may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in embodiments of this application.

A network device in embodiments of this application may be a device configured to communicate with the terminal. The network device may be a base transceiver station (BTS) in a global system for mobile communications (GSM) system or code division multiple access (CDMA), or may be a NodeB (NB) in a wideband code division multiple access (WCDMA) system, or may be an evolved NodeB (eNB or eNodeB) in an LTE system, or may be a radio controller in a cloud radio access network (CRAN) scenario. Alternatively, the network device may be a relay station, an access point, an in-vehicle device, a wearable device, a network device in a future 5G network, a network device in a future evolved PLMN network, or one antenna panel or a group of antenna panels (including a plurality of antenna panels) of a gNB in a 5G system, or may be a network node forming a gNB or a transmission point, for example, a baseband unit (BBU) or a distributed unit (DU). This is not limited in embodiments of this application.

In some deployment, the gNB may include a central unit (CU) and the DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be categorized as a radio access network (RAN) node, or the CU may be categorized as a core network (CN) node. This is not limited in this application.

The access network node in embodiments of this application is mainly responsible for functions such as radio resource management on an air interface side, quality of service (QoS) management, data compression and encryption, and the like. The access network node may include base stations in various forms, for example, a macro base station, a micro base station (also referred to as a small base station), a relay station, and an access point. In systems using different radio access technologies, names of devices having a base station function may be different. For example, in a 5th generation (5G) system, the device is referred to as a gNB. In an LTE system, the device is referred to as an evolved NodeB (eNB or eNodeB). In a 3rd generation (3G) system, the device is referred to as a NodeB. This is not limited in embodiments of this application.

The core network node in embodiments of this application is configured to provide a user connection, manage a user, and complete bearing for a service. For example, user connection setup includes functions such as mobility management (MM) and paging. User management includes user description, QoS, and security (corresponding security measures provided by an authentication center include security management of a mobile service and security processing on external network access). A bearer connection includes a public switched telephone network (PSTN) connected to the external, an external circuit data network, an external packet data network, internet (Internet), and the like. For example, the core network node may be an Access and mobility management function (AMF) entity, and is mainly responsible for a signaling processing part, namely, a control plane function, including an access control function, a mobility management function, an attach and detach function, and a gateway selection function, and the like. The core network node in embodiments of this application is not limited to an AMF.

For ease of understanding this application, related technical knowledge in embodiments of this application is described herein first.

Control plane cellular internet of things (CIoT) 5th generation system (5GS) optimization (Control plane CIoT 5GS Optimisation): User data (IP, Ethernet, and unstructured) or SMS messages can be effectively transmitted on a control plane by using the AMF without triggering establishment of user plane resources defined in TS 24.501.

Control plane cellular internet of things evolved packet system (EPS) optimization (Control plane CIoT EPS optimisation): User data (IP, non-IP, or SMS) can be effectively transmitted on a control plane by using an MME without triggering establishment of a data radio bearer defined in TS 24.301.

FIG. 1 is a schematic diagram of message sending according to an embodiment of this application. In a Rel-14 LTE system, core network overload control is introduced for UEs that support only control plane CIoT EPS optimization. That is, a mobility management entity (MME) sends an overload start message to a base station (eNB), to indicate the base station not to accept an access request in which a radio resource control (RRC) connection setup cause value (establishment Cause(-NB)) of UE (CP CIoT UE) supporting only control plane cellular internet of things (CP CIoT) is "mobile originated data service (mo-data)" or "delay tolerant access service (delayTolerantAccess)".

According to TS 36.413, if the overload action information element (Overload Action IE) in the overload response information element (Overload Response IE) within the overload start message is set to: not accept RRC connection requests for data transmission from UEs that only support control plane CIoT EPS optimization, that is, not accept access requests corresponding to RRC connection setup cause value of "mobile originated data service (mo-data)" or "delay tolerant access service (delayTolerantAccess)" in TS 36.331 for those UEs. Alternatively, if the traffic load reduction indication information element (Traffic Load Reduction Indication IE) is included in the overload start message and, if supported, indicates a percentage of rejected signaling traffic reduction, the signaling traffic indicated as to be rejected by the indicated percentage is reduced, or otherwise it is ensured that only the signaling traffic not indicated as to be rejected/not accepted is sent to the MME.

According to TS 23.401, the MME can use the Overload Start message to request the base station (eNodeB) to not accept access requests corresponding to RRC connection setup cause value of "mobile originated data service (mo-data)" or "delay tolerant access service (delayTolerantAccess)" for UEs.

Figure 2:
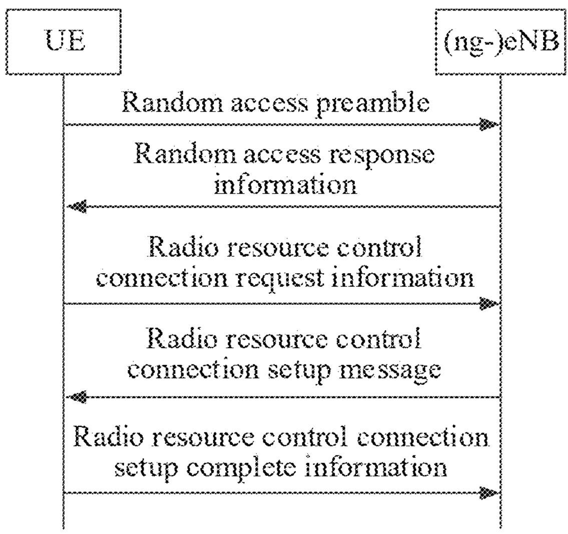
FIG. 2 is a schematic flowchart of air interface access according to an embodiment of this application.

FIG. 2 is a schematic flowchart of air interface access according to an embodiment of this application. As shown in FIG. 2, an air interface access process of UE (CP CIoT UE) that supports only control plane cellular internet of things is as follows: The UE sends a random access preamble to a base station. The base station sends random access response information to the UE. The UE sends radio resource control connection request (RRCConnectionRequest, usually referred to as msg3) information to the base station. The base station sends a radio resource control connection setup (RRCConnectionSetup) message to the UE. The UE sends a radio resource control connection setup complete (RRCConnectionSetupComplete, usually referred to as msg5) message to the base station, to implement air interface access of the UE.

The UE adds an RRC connection setup cause value to the radio resource control connection request message. The base station may determine whether the RRC connection setup cause value is "mobile originated data service (mo-data)" or "delay tolerant access service (delayTolerantAccess)". The UE notifies, in the radio resource control connection setup complete message, the base station whether the UE supports user plane CIoT EPS optimization (User Plane CIoT EPS optimization). Therefore, the base station can determine whether the UE supports only the control plane cellular internet of things CIoT. It should be noted that in the CP CIoT solution, msg5 carries a non-access stratum protocol data unit (NAS PDU).

When UE of narrowband internet of things (NarrowBand Internet of Things, NB-IoT) supports user plane (S1-U) or user plane (UP) cellular internet of things (CIoT) optimization (UP CIoT opt), the UE indicates user plane (UP) cellular internet of things (CIoT) EPS optimization information (up-CIoT-EPS-Optimization).

UE of enhanced machine type communication (eMTC)/LTE supports at least S1-U by default. Therefore, a case in which only CP CIoT is supported does not exist.

Therefore, after receiving a related overload start message from the MME, the base station sends an RRC release message to the UE to release an air interface connection if the setup cause value of the UE in msg3 is "mobile originated data service (mo-data)" or "delay tolerant access service (delayTolerantAccess)" and msg5 indicates that the UE supports only CP CIoT.

However, for UE that supports only NB-IoT (NB-IOT CP only UE), after the UE sends data to the base station by using non-access stratum (Non Access Stratum, NAS) information in msg5, the base station triggers radio resource control (connection) release (RRC release) due to core network overload. The NAS packet sent by the UE to the base station is discarded by the base station, but the UE is unaware of this. Note that since the overload action applies only to the EPS, this problem is limited to NB-IoT CP only UEs in the EPS.

In this scenario, the base station needs to inform the UE that the NAS PDU is not sent to a core network; or needs to inform the UE that the current access is rejected due to core network overload; or needs to inform the UE that no message is sent to the MME in the current access.

Figure 3:
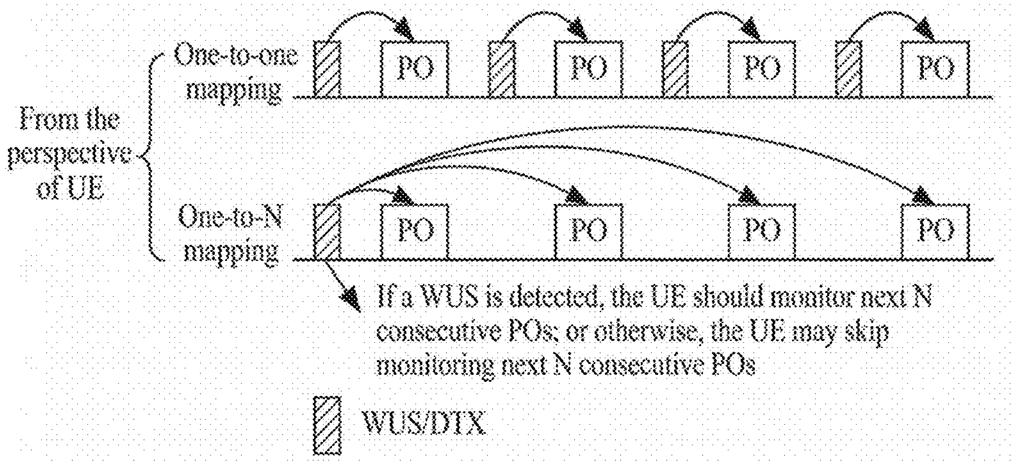
FIG. 3 is a schematic diagram of a wake up signal according to an embodiment of this application.

FIG. 3 is a schematic diagram of a wake up signal according to an embodiment of this application. The wake up signal is a method used to reduce paging monitoring overheads of a user. Originally, the UE needs to monitor a physical downlink control channel (PDCCH) in each paging cycle. Therefore, overheads are higher. A WUS signal is introduced before each paging occasion (PO). The UE monitors the WUS signal. If the WUS signal is detected, the UE needs to monitor the PDCCH channel. If the WUS signal is not detected, the UE does not monitor the PDCCH channel corresponding to the current PO. In addition, for UE that uses extended discontinuous reception (eDRX), one WUS signal may further correspond to a plurality of POs. That is, if the WUS signal is not detected, a plurality of subsequent POs are skipped. In FIG. 3, an example in which one WUS signal corresponds to four POs is used for description.

To reduce false paging alarms for UEs using a WUS in surrounding cells, the last cell solution is further introduced in the standard. That is, UE monitors a WUS only when the UE is still in a cell in which an RRC connection is released. On a network side, a base station sends information about the last cell of the UE to an MME or an AMF of a core network (CN) in a UE context release complete message on an interface (S1/NG interface) between a radio node and the core network. In a subsequent paging message triggered by the core network, the MME or AMF sends the information about the last cell to the base station, and the base station uses a WUS for the UE only in the last cell. That is, the UE monitors a WUS only in the last cell that served the UE (that is, the cell in which the RRC connection is released). The base station uses a WUS only when paging the UE in the last cell that served the UE. The core network notifies the base station of the information about the last cell when triggering paging. It should be noted that, when the core network sends a paging message to the base station, the base station is unaware of which previously served UE the paging message is about. Therefore, the base station needs to send the information about the last cell to the core network at the end of the last access of the UE. Then, the core network needs to provide the information about the last cell to the base station when sending the paging message to the base station.

The radio access network (RAN) and the UE may use a WUS to reduce idle mode power consumption of the UE. The RAN sends the WUS shortly before the paging occasion of the UE. The WUS feature enables the UE to determine that in a paging occasion immediately following the WUS occasion of the UE, the RAN is not paged if the RAN does not send a WUS to the UE, or the RAN may be paged if the RAN sends a WUS to the UE (see TS 36.304 [34])

To avoid waking up the UE due to an MME paging other UEs across multiple cells (e.g. due to frequent UE mobility and/or for low paging latency services such as VoLTE (Voice over LTE)), the use of a WUS by the eNB and the UE is restricted to the last used cell, i.e. the cell in which the RRC connection of the UE was last released. To support this:

a) WUS-capable eNBs should provide the recommended cells for paging IE and eNBs for paging IE (see TS 36.413 [36]) to the MME in the S1 UE context release complete or UE context pause suspend message;
b) if received during the last S1 UE context release complete or UE context suspend request message, the MME no longer provides (without modification) the recommended cells as assistance data for assistance cells IE in the S1-AP Paging message to the RAN (see TS 36.413 [36]); and
c) the MME deletes (or marks as invalid) the information on recommended cells and eNBs for paging when a new S1-AP association is established for the UE.

In the S1-AP paging message, the last used cell ID is sent in the "assistance data for recommended cells IE" in the assistance data for paging IE (see TS 36.413 [36]). When an S1-AP paging message for a WUS-capable UE is received and the S1-AP paging message further includes the assistance data for recommended cells IE, a WUS-capable eNB only broadcasts the WUS on the cell that matches an ID of the last used cell.

When the RRC connection of UE is released, the base station does not establish an S1 association with the core network (CN) (over the S1 interface). In the last cell solution, in this scenario, the information about the last cell stored in the UE is inconsistent with that stored in the core network. As a result, the UE cannot receive paging. That is, if the base station does not establish an S1 association with the core network when the RRC connection of the UE is released, the base station does not report the information about the last cell to the core network. As a result, the information about the last cell stored in the UE is inconsistent with that stored in the EPC, and the UE cannot receive paging. It should be noted that a same problem (for example, small data transmission) also exists in another scenario in which RRC is released but there is no S1/NG message (a message transmitted by using an S1/NG interface).

Therefore, the information about the last cell stored in the UE needs to be kept consistent with the information about the last cell stored on the network side, to avoid that the UE monitors a WUS in the last cell (cell-A) stored in the UE, but the network considers that the last cell of the UE is a cell-B. As a result, the base station does not use a WUS for the UE in the paging of the cell-A, and the UE cannot receive the paging.

The technical solutions provided in this application are applicable to a wireless communication network, for example, an E-UTRAN system or an NG-RAN system.

Figure 4:
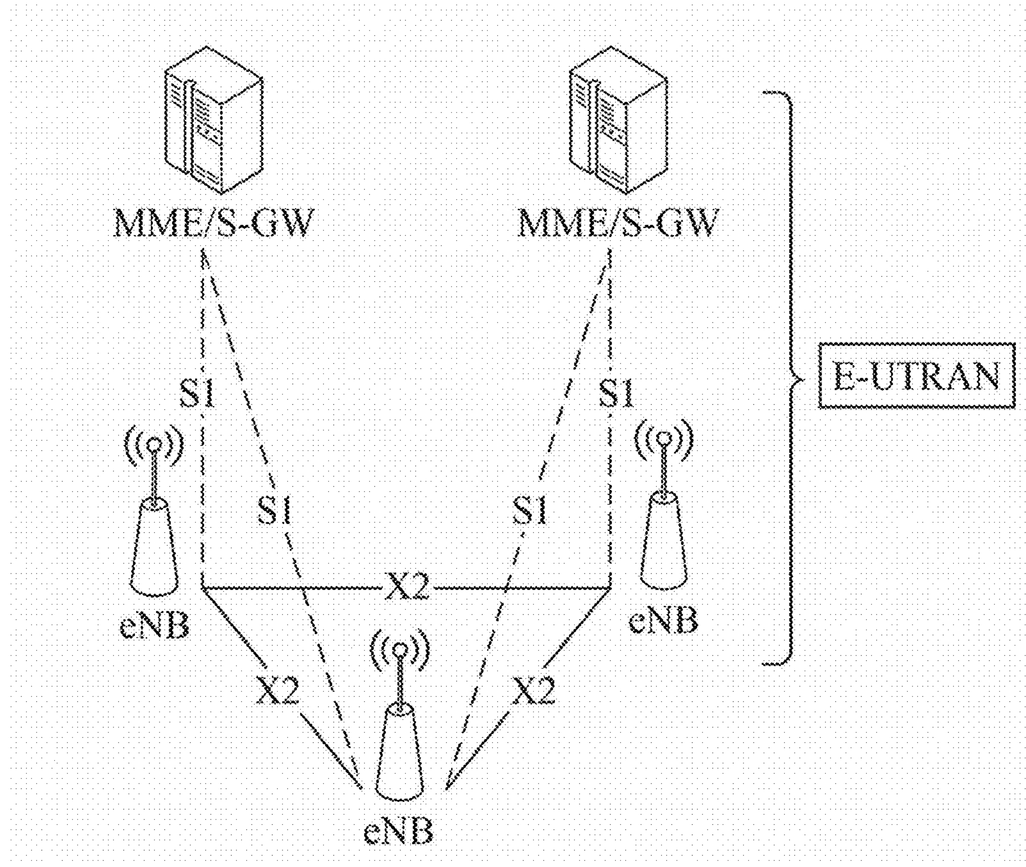
FIG. 4 is a schematic architectural diagram of a terrestrial radio access network (E-UTRAN) system according to an embodiment of this application.

FIG. 4 is a schematic architectural diagram of an E-UTRAN system according to an embodiment of this application. The E-UTRAN system includes an access network node and a core network node. The access network node may include a plurality of base stations (eNBs). The core network node may include a plurality of MMEs or serving gateways (Severing Gateway, S-GW). The base stations are connected by using an X2 interface, and the base stations are connected to the MME or the S-GW by using an S1 interface.

Figure 5:
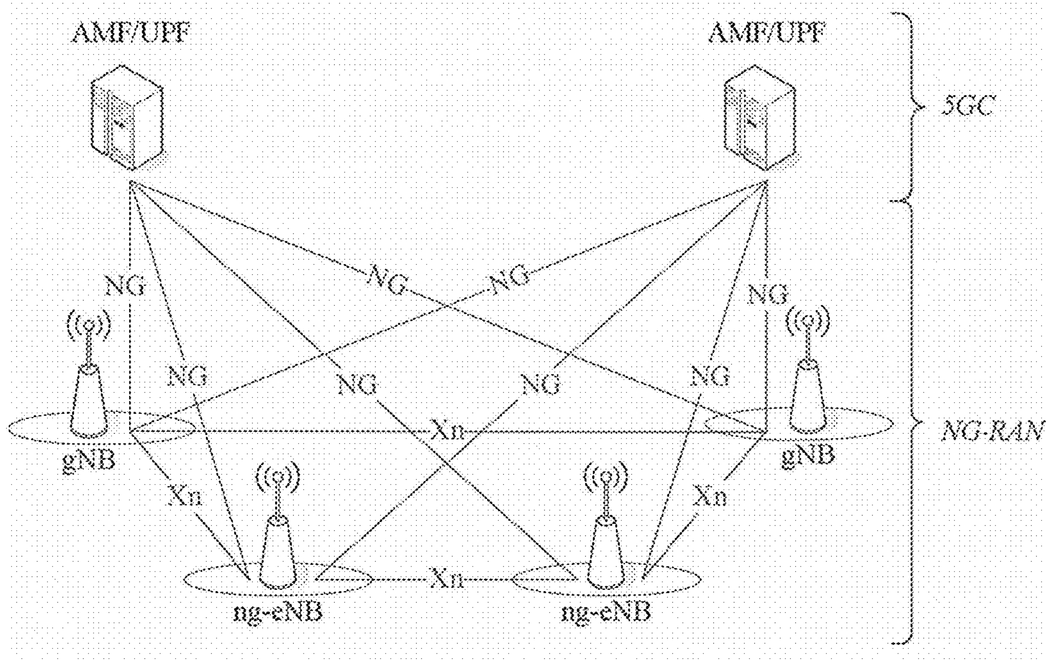
FIG. 5 is a schematic architectural diagram of a radio access network (NG-RAN) system according to an embodiment of this application.

FIG. 5 is a schematic architectural diagram of an NG-RAN system according to an embodiment of this application. The NG-RAN system includes an access network node and a core network node. The access network node may include a plurality of NG-RAN nodes. Each NG-RAN node may be a gNB and an ng-eNB. The core network node may include a plurality of AMFs or user plane function (UPF) entities. The NG-RAN nodes are connected to each other through an Xn interface, and the NG-RAN node is connected to the AMF or UPF through an NG interface.

It should be noted that in the foregoing two architectures provided in FIG. 4 and FIG. 5, both the eNB and the ng-eNB may provide an NB-IoT cell.

The following describes in detail technical solutions provided in this application with reference to specific implementations.

Figures 6, 7:
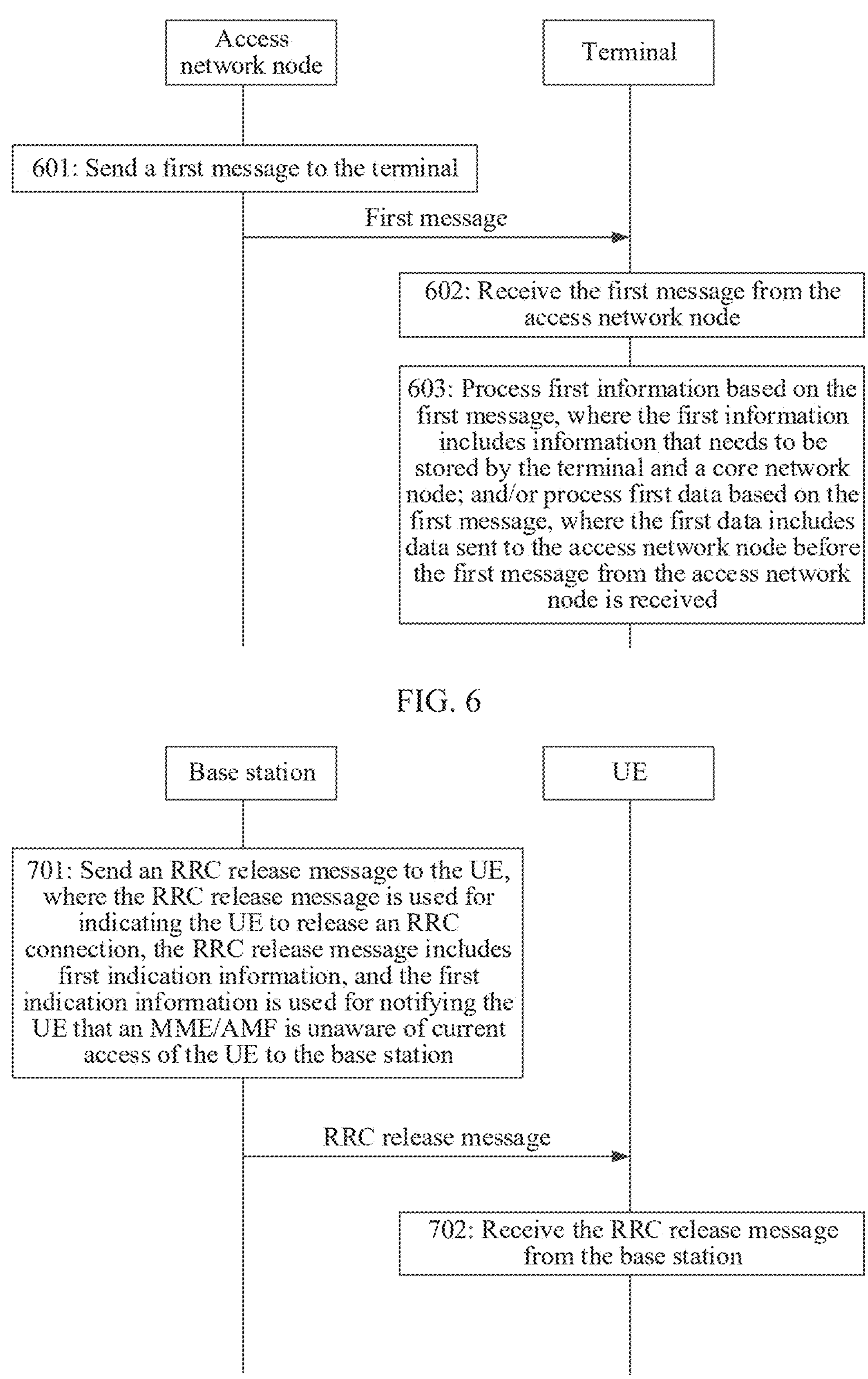
FIG. 6 is a schematic flowchart of a communication method according to an embodiment of this application.
FIG. 7 is a schematic flowchart of another communication method according to an embodiment of this application.

FIG. 6 is a schematic flowchart of a communication method according to an embodiment of this application. The method includes but is not limited to the following steps.

Step 601: An access network node sends a first message to a terminal.

Step 602: The terminal receives the first message from the access network node.

Step 603: The terminal processes first information based on the first message, where the first information includes information that needs to be stored in the terminal and a core network node; and/or processes first data based on the first message, where the first data includes data sent to the access network node before the first message from the access network node is received.

The first message may be a radio resource control release message. However, the first message is not limited thereto, and may be another message. In addition, the first message may carry an indication, for example, indicating that the core network node is overloaded or the first data is not sent to the core network node.

Embodiments of this application may be applied to a control plane cellular internet of things scenario, but are not limited thereto.

It should be noted that a purpose of processing, by the terminal, first information based on the first message is to ensure that the first information stored in the terminal is consistent with the first information stored in the core network node.

The first information may be the information about the last cell that served the terminal. However, the first information is not limited to only the information about the last cell that served the terminal, and may be other information that needs to be consistent between a terminal side and a network side, for example, time information of last access.

The first data may be data sent by the terminal to the access network node by using radio resource control connection setup complete information. After the terminal sends the first data to the access network node, the access network node may not send the first data to the core network node. Therefore, that the terminal processes the first data based on the first message may be that the terminal retransmits the first data to the access network node.

It can be learned that, in this embodiment, the terminal receives the first message from the access network node, and then the terminal processes the first information based on the first message. Because the first information includes the information that needs to be stored in the terminal and the core network node, when the first information is information about a last cell that served the terminal, the terminal processes the information about the last cell that served the terminal stored in the terminal, so that the information about the last cell that served the terminal stored in the terminal is consistent with the information about the last cell that served the terminal stored in the core network node, which helps the terminal monitor a wake up signal in the last cell that served the terminal stored in the terminal, and then receive paging based on the wake up signal; or the terminal processes the first data based on the first message. Because the first data includes the data sent to the access network node before the first message from the access network node is received, if the first data is not successfully sent, the terminal may retransmit the first data to the access network node based on the first message, thereby ensuring that the first data can be successfully sent.

In an example implementation, the first message includes first indication information, and the first indication information indicates at least one of the following: radio resource control connection reject; radio resource control connection failure; radio resource control connection release; no radio resource control connection is established; no connection to the core network node is established; the core network node is unaware of current access of the terminal; access failure; access reject; and the access network node does not send the first data to the core network node.

Specifically, the first indication information may include but is not limited to: the access network node rejects a radio resource control connection of the terminal; current radio resource control connection failure of the terminal; radio resource control connection reject caused by congestion; radio resource control connection release caused by congestion; the terminal is not connected to the core network node during current access; the core network node is unaware of current access of the terminal; access failure; access reject; a current radio resource control connection is not established; the access network node does not send, to the core network node, data sent by the terminal to the access network node; and data sent by the terminal to the access network node is discarded by the access network node.

For example, an MME or an AMF is unaware of current access of UE to a base station. It indicates that the base station does not send information about a cell during current access of the UE to the MME or the AMF. That is, the information about the last cell that served the UE stored in the MME or the AMF is still the information about the cell of a network during last access of the UE. When a paging message is triggered by a core network, the MME or the AMF sends, to the base station, the information about the cell of the network during last access of the UE, and the base station uses a WUS for the UE only in the cell of the network during last access of the UE. As a result, the UE cannot detect the WUS, and cannot receive paging from the base station. If the base station notifies, by using the indication information, the UE that the MME or the AMF is unaware of current access of the UE to the base station, the UE knows that the MME or the AMF does not store the information about the cell of the network during current access of the UE. That is, the UE knows that the information about the last cell that served the UE stored in the MME or the AMF is still the information about the cell of the network during last access of the UE. To receive paging from the base station, the UE does not update the information about the last cell that served the UE. In this way, after an RRC connection is released, the stored information about the last cell that served the UE is still the information about the cell of the network during last access of the UE.

It can be learned that in this implementation, the first message includes the first indication information. The first indication information indicates at least one of the following: a radio resource control connection reject, a radio resource control connection failure, a radio resource control connection release, no radio resource control connection established, no core network node connected, the core network node is unaware of current access of the terminal, access failure, access reject, and the access network node does not send the first data to the core network node. Therefore, after receiving the first message, the terminal may learn that the data sent to the access network node before receiving the first message is not sent to the core network node. The first data may be a non-access stratum protocol data unit NAS PDU (Non Access Stratum Protocol Data Unit) or user plane data.

In an example implementation, the processing first data includes retransmitting the first data.

It can be learned that in this implementation, when the first data sent by the terminal to the access network node is not sent to the core network node, the terminal may retransmit the first data during next access based on the first indication information in the first message. This helps ensure that the first data can be sent to the core network node.

In an example implementation, the first information includes information about a last cell that served the terminal. The information about the cell may be a physical cell identifier, a global cell identifier, a cell identifier, a cell frequency, or a cell index number of the cell, or the like.

It should be noted that, in the solution of the last cell that served the terminal, the access network node uses a wake up signal only in the last cell that served the terminal stored in the core network node, and the terminal monitors a wake up signal only in the last cell that served the terminal stored in the terminal. That is, the terminal can detect a wake up signal only when the last cell that served the terminal stored in the terminal and the last cell that served the terminal stored on the network side are the same cell. Further, after detecting a wake up signal in the stored last cell that served the terminal, the terminal monitors paging of the access network node based on the wake up signal.

It can be learned that, in this implementation, the first information includes the information about the last cell that served the terminal. After the terminal receives the first message from the access network node, the terminal learns, by using the first indication information, that the core network node is unaware of the current access of the terminal to the core network node. Therefore, the terminal processes, based on the first indication information, the information about the last cell that served the terminal stored in the terminal, so that the information about the last cell that served the terminal stored in the terminal is consistent with the information about the last cell that served the terminal stored in the core network node. It is beneficial for the terminal to monitor a wake up signal in the cell corresponding to the stored information about the last cell that served the terminal, and further receive paging based on the wake up signal.

In an example implementation, the processing first information includes: skipping updating the information about the last cell that served the terminal; or saving information about a cell of the access network node during last access of the terminal as the information about the last cell that served the terminal.

It should be noted that, in some cases, the information about the last cell that served the terminal stored in the terminal may be inconsistent with that stored in the core network node.

For example, after releasing the RRC connection, the UE updates the information about the last cell that served the UE stored in the UE, that is, updates the last cell that served the UE stored in the UE to a cell of the network during current access of the UE (that is, a cell in which the RRC connection is released currently). If the base station discards a data packet sent by the UE to the base station, the core network is unaware of the cell during current access of the UE. Therefore, the last cell that served the UE stored on the network side is still the cell of the network during last access of the UE rather than the cell during current access of the UE. Once the UE updates the information about the last cell that served the UE stored in the UE, the information about the last cell that served the UE stored on the network side is inconsistent with that stored on a UE side. As a result, the base station uses a wake up signal in the cell of the network during last access of the UE, but the UE monitors a wake up signal in the currently accessed cell. Consequently, the UE cannot detect a wake up signal in the currently accessed cell, and the UE cannot receive paging from the base station in the currently accessed cell.

In this implementation, the first indication information may be introduced in the first message, and the first indication information indicates at least one of the following: radio resource control connection reject; radio resource control connection failure; radio resource control connection release; no radio resource control connection is established; no connection to the core network node is established; the core network node is unaware of current access of the terminal; and the access network node does not send the first data to the core network node. When the first indication information exists in the first message, the terminal skips updating the information about the last cell that served the terminal or saves information about a cell of the access network node during last access of the terminal as the information about the last cell that served the terminal. In this way, the last cell that served the UE stored in the UE is still the cell of the network during last access of the UE, and the last cell that served the UE stored in the network is also the cell of the network during last access of the UE. In this way, the base station uses a wake up signal in the cell of the network during last access of the UE, and the UE monitors paging after detecting the wake up signal, so that the UE can receive paging of the base station in the cell of the network during last access of the UE.

It can be learned that, in this implementation, the first information includes the information about the last cell that served the terminal. After the terminal receives the first message from the access network node, the terminal learns that the core network node is unaware of the current access of the terminal to the core network node. Therefore, the terminal does not update the stored information about the last cell that served the terminal or saves the information about the cell of the access network node during last access of the terminal as the information about the last cell that served the terminal, so that the information about the last cell that served the terminal stored in the terminal is consistent with the information about the last cell that served the terminal stored in the core network node. It is beneficial for the terminal to detect a wake up signal in the cell corresponding to the stored information about the last cell that served the terminal, and further receive paging based on the wake up signal.

In an example implementation, after the processing first information based on the first message, the method further includes: if the terminal is located in the cell corresponding to the information about the last cell that served the terminal, monitoring, by the terminal, a wake up signal, and receiving paging based on the wake up signal; and if the terminal is located in a first cell, skipping monitoring, by the terminal, the wake up signal, where the first cell does not include the cell corresponding to the information about the last cell that served the terminal.

For the access network node, after the sending, by an access network node, a first message to a terminal, the method further includes: receiving, by the access network node, a paging message from the core network node, where the paging message includes the information about the last cell that served the terminal; and using, by the access network node, a wake up signal during paging of the terminal in the cell corresponding to the information about the last cell that served the terminal, and skipping using the wake up signal during paging of the terminal in a first cell, where the wake up signal is used for indicating the terminal to receive paging, and the first cell does not include the cell corresponding to the information about the last cell that served the terminal.

Specifically, when the terminal is in the last cell that served the terminal stored in the terminal, the terminal first monitors a wake up signal, and then monitors paging of the access network node after detecting the wake up signal. In another cell, the terminal directly monitors paging. Compared with the last cell that served the terminal stored in the terminal, the terminal keeps monitoring paging in another cell, resulting in higher paging monitoring overheads. However, in the last cell that served the terminal stored in the terminal, the terminal monitors a PDCCH channel only after detecting a wake up signal, and does not monitor a PDCCH channel corresponding to current paging if no WUS signal is detected. Therefore, paging monitoring overheads are lower.

It can be learned that, in this implementation, if the terminal is located in the last cell that served the terminal stored in the terminal, the terminal monitors a wake up signal, and receives paging based on the wake up signal. If the terminal is located in another cell other than the last cell that served the terminal stored in the terminal, the terminal skips monitoring a wake up signal. The terminal monitors a wake up signal in the last cell that served the terminal stored in the terminal, and the terminal monitors paging only after detecting a wake up signal, thereby helping reduce paging monitoring overheads of the terminal.

In an example implementation, the first message includes a radio resource control release message.

The first message in embodiments of this application may be a radio resource control release message. Therefore, embodiments of this application may be applied to all scenarios in which a terminal is released by radio resource control but the core network node is unaware of the release, for example, the core network node is overloaded, or the core network node and the access network node do not establish an S1 interface association or an NG interface association about the terminal.

Specifically, the base station may send an RRC connection release message or an RRC release message (RRC Connection Release/RRC Release) to the UE, to initiate an RRC connection release process of the UE. After receiving the RRC connection release message/RRC release message, the UE may release the RRC connection, and switch from an RRC_connected state (RRC_CONNECTED state) to an RRC_idle state (RRC_IDLE state) or an RRC_inactive state (RRC_INACTIVE state).

It can be learned that, in this implementation, the access network node sends the radio resource control release message to the terminal, to indicate the terminal to release a radio resource control connection, so that the terminal learns that the core network node is unaware of the current access of the terminal to the core network node, and after the radio resource control connection is released, the terminal processes the information about the last cell that served the terminal stored in the terminal, for example, does not update the information about the last cell that served the terminal stored in the terminal, so that the information about the last cell that served the terminal stored in the terminal is consistent with the information about the last cell that served the terminal stored in the core network node.

In an example implementation, the first indication information includes a radio resource control release cause (RRC release cause).

The specific indication information may be a radio resource control release cause or may be separate indication information. The separate indication information is relative to using the radio resource control release cause as the indication information.

For example, content of the indication information may be release for core network overload (release for CN overload), release without core network involvement (release without CN involvement), immediate release, connection reject, or the like. This indicates that the MME or the AMF is unaware of the current access of the UE, or in other words, the base station does not establish an S1 interface association or an NG interface association about the UE with the MME or the AMF.

It can be learned that, in this implementation, in a paging process, the core network node sends the information about the last cell that served the terminal that needs to be paged to the access network node, and then the access network node uses a wake up signal when initiating paging in the last cell that served the terminal. Therefore, if indication information in the radio resource control release message indicates that when radio resource control is released, the access network node does not report, to the core network node, information about a serving cell currently accessed by the terminal. In this case, to receive paging from the access network node, the terminal does not update the information about the last cell that served the terminal stored in the terminal, so that the information about the last cell that served the terminal stored on a terminal side is consistent with the information about the last cell that served the terminal stored on a core network node side.

In an example implementation, the method further includes: sending, by the terminal, a second message to the access network node, where the second message includes second indication information, and the second indication information indicates whether the terminal supports only control plane cellular internet of things (CP CIoT) or whether the terminal supports user plane cellular internet of things (UP CIoT).

The second message may be a radio resource control connection setup complete message, but is not limited thereto, and may be another message. A function of the second message is to notify the access network node whether the terminal supports only control plane cellular internet of things or whether the terminal supports user plane cellular internet of things.

For example, the terminal may use the radio resource control connection setup complete message to carry the second indication information, and notify, by using the second indication information, the access network node whether the terminal supports only control plane cellular internet of things or whether the terminal supports user plane cellular internet of things.

It can be learned that in this implementation, the terminal may send the second message to the access network node. The second message includes the second indication information, and the second indication information indicates whether the terminal supports cellular internet of things. Therefore, the access network node may learn, by using the second message, whether the terminal supports only control plane cellular internet of things or whether the terminal supports user plane cellular internet of things. When the core network node is overloaded, the core network node does not accept access of a terminal that supports only control plane cellular internet of things or does not support user plane cellular internet of things. Therefore, the access network node may determine, by using the second indication information in the second message, whether to accept access of the terminal.

In an example implementation, the receiving a first message from an access network node includes: if the core network node is overloaded and the terminal supports only control plane cellular internet of things or the terminal does not support user plane cellular internet of things, receiving, by the terminal, the radio resource control release message from the access network node.

Specifically, when the core network node is overloaded and the terminal supports only control plane cellular internet of things or the terminal does not support user plane cellular internet of things, radio resource control release is triggered. Therefore, the access network node sends the radio resource control release message to the terminal. The terminal releases a radio resource control connection after receiving the radio resource control release message from the access network node.

It can be learned that in this implementation, when the core network node is overloaded, the core network node does not accept access of a terminal that supports only control plane cellular internet of things or does not support user plane cellular internet of things. If the access network node knows that the terminal supports only control plane cellular internet of things or does not support user plane cellular internet of things, the access network node sends a radio resource control release message to the terminal, to reject access of the terminal.

In an example implementation, the method further includes: receiving, by the access network node, an overload start message from the core network node, where the overload start message is used for indicating that access of a terminal that supports only control plane cellular internet of things is not accepted; and receiving, by the access network node, a second message from the terminal, where the second message includes second indication information, and the second indication information indicates whether the terminal supports only control plane cellular internet of things or whether the terminal supports user plane cellular internet of things.

Specifically, when the core network node is overloaded, the core network node sends the overload start message to the access network node. The overload start message is used for indicating not to accept access of a terminal that supports only control plane cellular internet of things. In addition, the access network node further receives the second message from the terminal. The second message includes the second indication information, and the second indication information indicates whether the terminal supports only control plane cellular internet of things or whether the terminal supports user plane cellular internet of things. The access network node may determine whether to send the radio resource control release message to the terminal, to not accept the access of the terminal.

It can be learned that in this implementation, when the core network node is overloaded, the core network node may send the overload start message to the access network node, to indicate not to accept access of a terminal that supports only control plane cellular internet of things. In addition, the access network node may receive the second message from the terminal. The second message includes the second indication information, and the second indication information indicates whether the terminal supports only control plane cellular internet of things or whether the terminal supports user plane cellular internet of things. Therefore, the access network node may determine, by using the second indication information in the second message, whether to accept access of the terminal when the core network node is overloaded.

The following describes this embodiment in detail with reference to specific examples. FIG. 7 is a schematic flowchart of another communication method according to an embodiment of this application. The method includes but is not limited to the following steps.

Step 701: A base station sends an RRC release message to UE, where the RRC release message is used for indicating the UE to release an RRC connection, the RRC release message includes first indication information, and the first indication information is used for notifying the UE that an MME/AMF is unaware of current access of the UE to the base station.

Step 702: The UE receives the RRC release message from the base station.

Specifically, the base station adds indication information to the RRC release message, to notify the UE that the MME or AMF is unaware of the current access of the UE to the base station. Because the UE knows that the MME or the AMF is unaware of the current access of the UE to the base station, the UE knows that data transmitted to the base station by using a NAS is not sent to a network, that is, is not sent to the MME or the AMF. The UE does not update information about a last cell that served the UE, or the UE stores information about a cell that served the UE during last access as the information about the last cell that served the UE.

It can be learned that the UE may know, by using the first indication information, whether a data packet sent by the UE to the base station by using the NAS in msg5 is sent to a core network, so that information about a last cell that served the UE stored on a UE side can be kept consistent with that stored on a core network side, thereby avoiding paging failure.

It can be learned that in this example, the base station adds the indication information to the RRC release message to notify the UE that the MME or the AMF is unaware of the current access of the UE to the base station. Therefore, the UE knows that the data transmitted to the base station by using the NAS is not sent to the MME or the AMF. Therefore, the UE does not update the information about the last cell that served the UE. In this way, the information about the last cell that served the UE stored on the UE side is consistent with that stored on the core network side, helping the base station page the UE.

Figure 8:
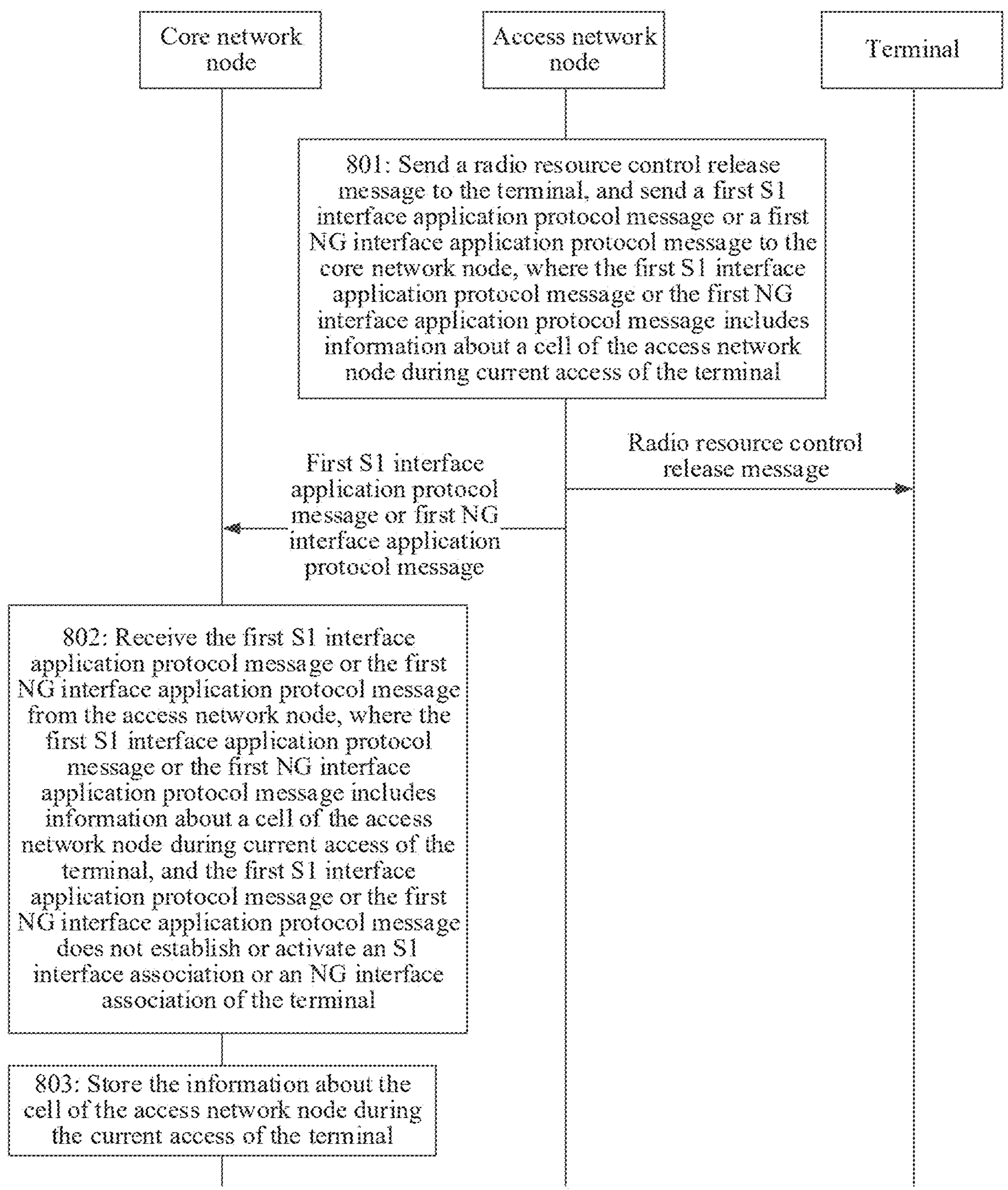
FIG. 8 is a schematic flowchart of still another communication method according to an embodiment of this application.

FIG. 8 is a schematic flowchart of still another communication method according to an embodiment of this application. The method includes but is not limited to the following steps.

Step 801: An access network node sends a radio resource control release message to a terminal, and sends a first S1 interface application protocol (S1AP) message or a first NG interface application protocol (NGAP) message to a core network node, where the first S1 interface application protocol message or the first NG interface application protocol message includes information about a cell of the access network node during current access of the terminal.

Step 802: The core network node receives a first S1 interface application protocol message or a first NG interface application protocol message from an access network node, where the first S1 interface application protocol message or the first NG interface application protocol message includes information about a cell of the access network node during current access of a terminal, and the first S1 interface application protocol message or the first NG interface application protocol message does not establish or activate an S1 interface association or an NG interface association of the terminal.

Step 803: The core network node stores the information about the cell of the access network node during current access of the terminal.

The first S1 interface application protocol message or the first NG interface application protocol message does not establish or activate the S1 interface association or the NG interface association of the terminal. That is, when sending the first S1 interface application protocol message or the first NG interface application protocol message to the core network node, the access network node does not establish an S1 interface association or an NG interface association about the terminal between a core network and an access network, or does not activate the S1 interface association or the NG interface association about the terminal between the core network and the access network. Therefore, in this implementation, even if the S1 interface association or the NG interface association about the terminal is not established or activated between the core network and the access network, the access network node can still send, to the core network node, the information about the cell of the access network node during current access of the terminal. In addition, after receiving the radio resource control release message from the access network node, the terminal releases a radio resource control connection, and updates the information about the last cell that served the terminal. That is, the terminal updates the information about the cell of the access network node during current access of the terminal to the information about the last cell that served the terminal. Therefore, the information about the last cell that served the terminal stored in the terminal is consistent with the information about the last cell that served the terminal stored in the core network node.

For example, after releasing the RRC connection, the UE updates the information about the last cell that served the terminal stored in the UE, that is, updates the information about the last cell that served the UE stored in the UE to the information about the cell of the network during current access of the UE (that is, the cell in which the RRC connection is currently released). The base station knows the cell of the network during current access of the UE, and the base station may send the information about the cell of the network during current access of the UE to an MME or an AMF by using the S1AP information or the NGAP message. Therefore, the information about the last cell that served the UE stored in the MME or the AMF is consistent with the information about the last cell that served the UE stored in the UE. In a subsequent paging message triggered by the core network, the MME or the AMF sends the stored information about the last cell that served the UE to the base station, and the base station uses a WUS for the UE only in the cell in which the RRC connection of the UE is currently released, so that the UE is successfully paged.

It can be learned that, in this embodiment, the access network node sends the radio resource control release message to the terminal. After receiving the radio resource control release message, the terminal releases a radio resource control connection, and updates information about a last cell that served the terminal stored in the terminal, that is, saves the information about the cell of the access network node during current access of the terminal as the information about the last cell that served the terminal. In addition, the access network node further sends the information about the cell of the access network node during current access of the terminal to the core network node by using the first S1 interface application protocol message or the first NG interface application protocol message. In this way, the information about the last cell that served the terminal stored in the terminal is consistent with information about a last cell that served the terminal stored in the core network node. It is beneficial for the terminal to monitor a wake up signal in the last cell that served the terminal stored in the terminal, and further receive paging based on the wake up signal.

In an example implementation, the first S1 interface application protocol message or the first NG interface application protocol message does not establish or activate an S1 interface association or an NG interface association of the terminal.

It can be learned that in this implementation, the first S1 interface application protocol message or the first NG interface application protocol message does not establish or activate the S1 interface association or the NG interface association of the terminal. That is, when sending the first S1 interface application protocol message or the first NG interface application protocol message to the core network node, the access network node does not establish an S1 interface association or an NG interface association about the terminal between a core network and an access network, or does not activate the S1 interface association or the NG interface association about the terminal between the core network and the access network. Therefore, in this implementation, even if the S1 interface association or the NG interface association about the terminal is not established or activated between the core network and the access network, the access network node can still send, to the core network node, the information about the cell of the access network node during current access of the terminal.

In an example implementation, the method further includes: receiving, by the access network node, an overload start message from the core network node, where the overload start message is used for indicating that access of a terminal that supports only control plane cellular internet of things is not accepted; and receiving, by the access network node, a second message from the terminal, where the second message includes second indication information, and the second indication information indicates whether the terminal supports only control plane cellular internet of things or whether the terminal supports user plane cellular internet of things.

Specifically, when the core network node is overloaded, the core network node sends the overload start message to the access network node. The overload start message is used for indicating not to accept access of a terminal that supports only control plane cellular internet of things. In addition, the access network node further receives the second message from the terminal. The second message includes the second indication information, and the second indication information indicates whether the terminal supports only control plane cellular internet of things or whether the terminal supports user plane cellular internet of things. The access network node may determine whether to send the radio resource control release message to the terminal, to not accept the access of the terminal.

The second message may include a radio resource control connection setup complete message.

It can be learned that in this implementation, when the core network node is overloaded, the core network node may send the overload start message to the access network node, to indicate not to accept access of a terminal that supports only control plane cellular internet of things. In addition, the access network node may receive the second message from the terminal. The second message includes the second indication information, and the second indication information indicates whether the terminal supports only control plane cellular internet of things or whether the terminal supports user plane cellular internet of things. Therefore, the access network node may determine, by using the second indication information in the second message, whether to accept access of the terminal when the core network node is overloaded.

In an example implementation, the sending a radio resource control release message to a terminal, and sending a first S1 interface application protocol message or a first NG interface application protocol message to a core network node includes: if the terminal supports only control plane cellular internet of things or the terminal does not support user plane cellular internet of things, sending, by the access network node, the radio resource control release message to the terminal, and sending the first S1 interface application protocol message or the first NG interface application protocol message to the core network node.

Specifically, because the core network is overloaded, if the terminal supports only control plane cellular internet of things or the terminal does not support user plane cellular internet of things, it indicates that the core network node does not accept access of the terminal. Therefore, the access network node sends the radio resource control release message to the terminal. To ensure that the information about the last cell that served the terminal stored in the terminal is consistent with the information about the last cell that served the terminal stored in the core network node, the access network node further sends, to the core network node by using the first S1 interface application protocol message or the first NG interface application protocol message, the information about the cell currently accessed by the terminal for storage.

It can be learned that in this implementation, when the core network node is overloaded and the terminal supports only control plane cellular internet of things or the terminal does not support user plane cellular internet of things, the access network node sends the radio resource control release message to the terminal, to reject access of the terminal, so that the terminal releases the radio resource control connection, and saves the information about the cell of the access network node during current access of the terminal as the information about the last cell that served the terminal. The access network node sends the first S1 interface application protocol message or the first NG interface application protocol message to the core network node, to send, to the core network node for storage, the information about the cell of the access network node during current access of the terminal, so that the information about the last cell that served the terminal stored in the terminal is consistent with the information about the last cell that served the terminal stored in the core network node.

In an example implementation, the radio resource control release message includes first indication information, and the first indication information indicates at least one of the following: radio resource control connection reject; radio resource control connection failure; radio resource control connection release; no radio resource control connection is established; no connection to the core network node is established; the core network node is unaware of current access of the terminal; access failure; access reject; and the access network node does not send first data to the core network node, where the first data includes data sent by the terminal to the access network node.

It can be learned that in this implementation, the radio resource control release message includes the first indication information, and the first indication information indicates at least one of the following: the radio resource control connection reject; the radio resource control connection failure; the radio resource control connection release; no radio resource control connection is established; no connection to the core network node is established; the core network node is unaware of the current access of the terminal; the access failure; the access reject; and the access network node does not send the first data to the core network node. Therefore, after receiving the radio resource control release message, the terminal may learn that the data sent to the access network node before the radio resource control release message is received is not sent to the core network node.

In an example implementation, the first indication information is used by the terminal to process the first data, and the first data includes data received from the terminal before the radio resource control release message is sent to the terminal.

For example, the first data is a message sent by the terminal to the access network node by using the radio resource control connection setup complete message. Because the access network node does not send the first data to the core network node, the access network node may indicate, by using the first indication information, the terminal to retransmit the first data.

It can be learned that in this implementation, when the first data sent by the terminal to the access network node is not sent to the core network node, the terminal may retransmit the first data during next access based on the first indication information in the first message. This helps ensure that the first data can be sent to the core network node.

In an example implementation, the first S1 interface application protocol message or the first NG interface application protocol message further includes an identifier of the terminal.

For example, the identifier of the terminal may be a temporary mobile subscriber identity (S-TMSI) of the UE, an S1 interface application protocol identifier (S1AP ID) of the UE, an NG interface application protocol identifier (NGAP ID) of the UE, or the like.

The information about the last cell that served the terminal may be associated and stored with the identifier of the terminal. When the terminal needs to be paged, the core network node may accurately send, to the access network node by using the stored identifier of the terminal, the information about the last cell that served the terminal, so that it is ensured that the terminal is paged.

It can be learned that, in this implementation, when sending the updated information about the last cell that served the terminal to the core network node, the access network node sends the identifier of the terminal to the core network node, and the core network node may associate and store the information about the last cell that served the terminal with the identifier of the terminal. When the terminal needs to be paged, the core network node may accurately send, to the access network node by using the stored identifier of the terminal, the information about the last cell that served the terminal, so that the access network node uses a wake up signal when initiating paging in the last cell that served the terminal, and the terminal successfully receives the paging of the access network node.

In an example implementation, the first S1 interface application protocol message or the first NG interface application protocol message includes retrieve UE information Retrieve UE Information.

The retrieve UE information Retrieve UE Information is an existing message on the SLAP or NGAP. The access network node may reuse the message, and use the message to carry an indication, to send the updated information about the last cell that served the terminal, the identifier of the terminal, and the like to the core network node. In addition, the access network node may not reuse the Retrieve UE Information message, but newly define another message, to send, to the core network node, the updated information about the last cell that served the terminal, the identifier of the terminal, and the like. This is not specifically limited in this application.

It can be learned that, in this implementation, the access network node sends the information about the last cell that served the terminal to the core network node by using an existing message (that is, Retrieve UE Information) in the S1 interface application protocol or the NG interface application protocol.

Figure 9:
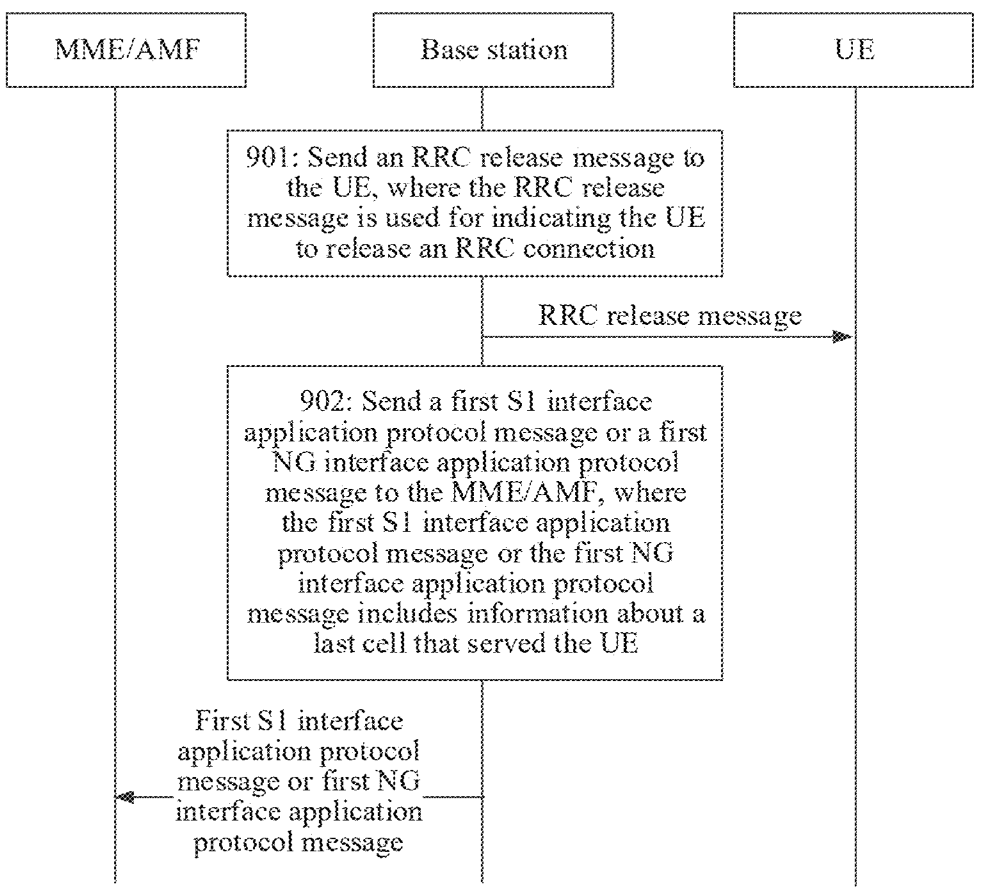
FIG. 9 is a schematic flowchart of still another communication method according to an embodiment of this application.

The following describes this embodiment in detail with reference to specific examples. FIG. 9 is a schematic flowchart of still another communication method according to an embodiment of this application. The method includes but is not limited to the following steps.

Step 901: A base station sends an RRC release message to UE, where the RRC release message is used for indicating the UE to release an RRC connection.

Step 902: The base station sends a first S1 interface application protocol message or a first NG interface application protocol message to an MME/AMF, where the first S1 interface application protocol message or the first NG interface application protocol message includes information about a last cell that served the UE.

Specifically, the base station sends the RRC release message to the UE, then the UE releases the RRC connection, and updates information about a currently accessed cell (that is, the cell in which the RRC connection is currently released) to the information about the last cell that served the UE. In addition, when releasing the RRC connection to the UE, the base station sends, to the MME/AMF by using the first S1 interface application protocol message or the first NG interface application protocol message, the information about the cell during current access of the UE (that is, the cell in which the RRC connection is currently released), and then the MME/AMF updates the information about the cell during current access of the UE (that is, the cell in which the RRC connection is released currently) to the information about the last cell that served the UE. Therefore, the information about the last cell that served the UE stored on a UE side can be kept consistent with that stored on a core network side, thereby avoiding a paging failure.

The base station may use the RRC release message to carry indication information. The indication information is used for notifying the UE that the MME/AMF is unaware of the current access of the UE to the base station, but the UE still normally updates the information about the last cell that served the UE, that is, stores the currently accessed cell as the last cell that served the UE.

It should be noted that, in this example, a sequence in which the base station performs step 901 and step 902 is not limited. Step 901 may be performed before step 902, or step 902 may be performed before step 901, or step 901 and step 902 may be triggered together.

It can be learned that in this example, the base station sends the RRC release message to the UE, the UE releases the RRC connection, and the UE updates the information about the currently accessed cell to the information about the last cell that served the UE. The base station sends the information about the cell during current access of the UE to the MME or the AMF, and the MME/AMF updates the information about the cell during current access of the UE to the information about the last cell that served the UE. In this way, the information about the last cell that served the UE stored on the UE side is consistent with that stored on the core network side, helping the base station page the UE.

Figure 10:
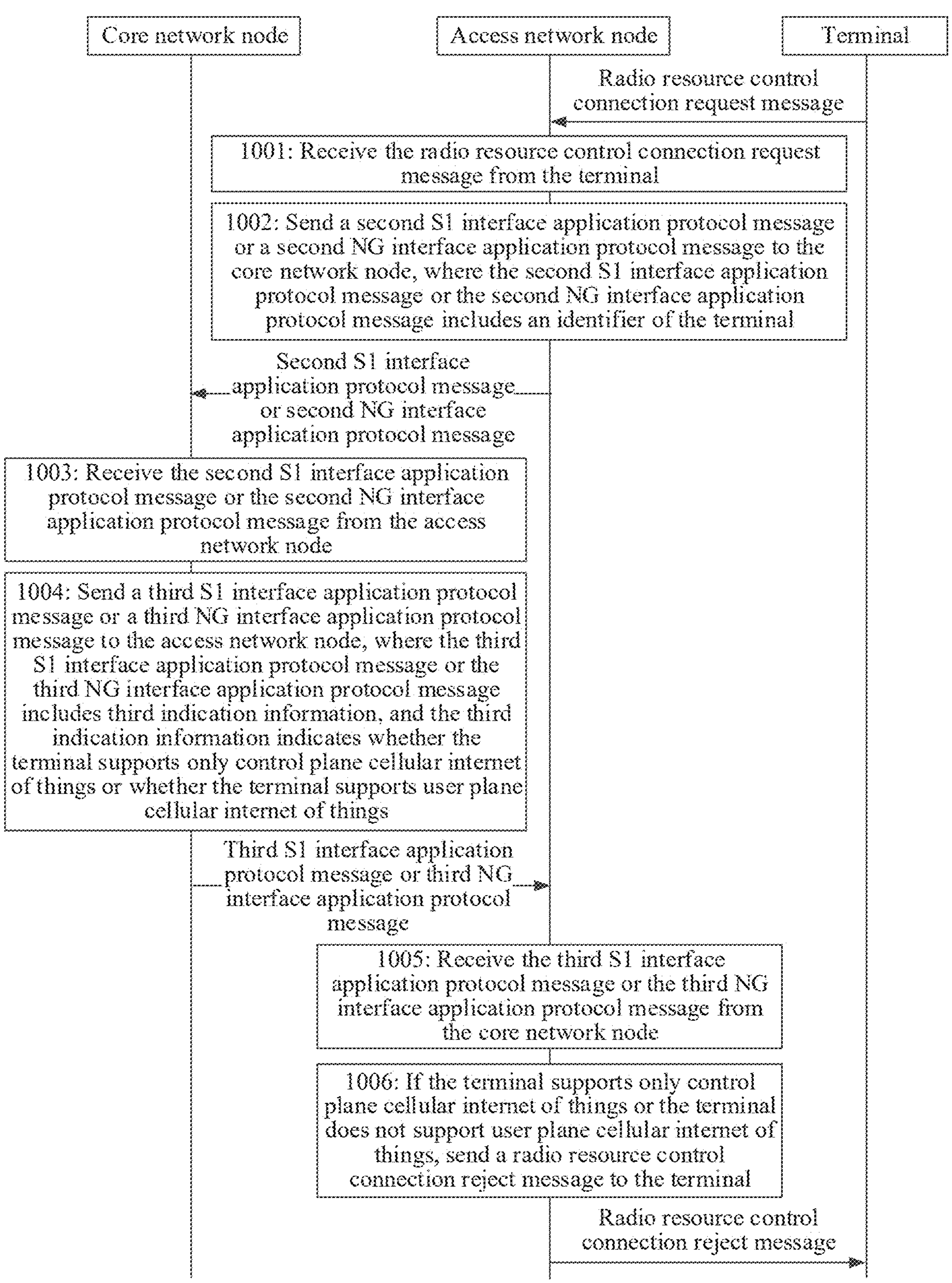
FIG. 10 is a schematic flowchart of still another communication method according to an embodiment of this application.

FIG. 10 is a schematic flowchart of still another communication method according to an embodiment of this application. The method includes but is not limited to the following steps.

1001: An access network node receives a radio resource control connection request

1002: The access network node sends a second S1 interface application protocol message or a second NG interface application protocol message to a core network node, where the second S1 interface application protocol message or the second NG interface application protocol message includes an identifier of the terminal.

1003: The core network node receives the second S1 interface application protocol message or the second NG interface application protocol message from the access network node.

1004: The core network node sends a third S1 interface application protocol message or a third NG interface application protocol message to the access network node, where the third S1 interface application protocol message or the third NG interface application protocol message includes third indication information, and the third indication information indicates whether the terminal supports only control plane cellular internet of things or whether the terminal supports user plane cellular internet of things.

1005: The access network node receives the third S1 interface application protocol message or the third NG interface application protocol message from the core network node.

1006: If the terminal supports only control plane cellular internet of things or the terminal does not support user plane cellular internet of things, the access network node sends a radio resource control connection reject message to the terminal.

It may be understood that, before the terminal establishes the radio resource control connection to the access network node, the access network node is unaware of whether the terminal supports only control plane cellular internet of things or whether the terminal supports user plane cellular internet of things. Therefore, the access network node may send the identifier of the terminal to the core network node by using the second S1 interface application protocol message or the second NG interface application protocol message. The core network node then sends, to the access network node by using the third S1 interface application protocol message or the third NG interface application protocol message, a result of whether the terminal supports cellular internet of things. Therefore, the access network node obtains, from a core network side, whether the terminal supports only control plane cellular internet of things or whether the terminal supports user plane cellular internet of things.

The identifier of the terminal may be a temporary mobile subscriber identity (S-TMSI) of the UE, an S1 interface application protocol identifier (SLAP ID) of the UE, an NG interface application protocol identifier (NGAP ID) of the UE, or the like.

For example, after the UE sends the radio resource control connection request to the base station, because the MME or the AMF does not establish or activate the S1 interface association or NG interface association about the UE with the base station, or a NAS packet sent by the UE to the base station is discarded by the base station and the base station does not send the NAS packet to the MME or the AMF, or the MME or AMF is overloaded, or there may be another reason that may cause the MME or the AMF to fail to obtain the information about the cell that served the UE when the UE currently initiates the connection request, the base station may reject the current radio resource control connection request of the UE. Therefore, the UE does not access the network currently, and therefore does not update the information about the last cell that served the UE. Therefore, the information about the last cell that served the UE recorded on a network side and a UE side is still the information about the cell of the network during last access of the UE. In this way, the base station may use a wake up signal in the cell of the network during last access of the UE, to page the UE.

It can be learned that in this embodiment, after receiving the radio resource control connection request message of the terminal, the access network node sends the second S1 interface application protocol message or the second NG interface application protocol message to the core network node, to notify the core network node of the identifier of the terminal. The core network node may determine, by using the identifier of the terminal, whether the terminal is a terminal that supports only control plane cellular internet of things or whether the terminal is a terminal that supports user plane cellular internet of things. Then, the core network node sends the third S1 interface application protocol message or the third NG interface application protocol message to the access network node, and notifies the access network node of a result of whether the terminal is a terminal that supports only control plane cellular internet of things or whether the terminal is a terminal that supports user plane cellular internet of things. If the terminal supports only control plane cellular internet of things or the terminal does not support user plane cellular internet of things, the access network node directly rejects the radio resource control connection request of the terminal. Because the radio resource control connection request initiated by the terminal is rejected, the terminal fails to access the network, and the terminal does not update the information of the last cell that served the terminal stored in the terminal. Therefore, the information about the last cell that served the terminal stored on a terminal side is consistent with the information about the last cell that served the terminal stored on a network side. It is beneficial for the terminal to monitor a wake up signal in the last cell that served the terminal stored in the terminal, and further receive paging based on the wake up signal.

In an example implementation, the method further includes: receiving, by the access network node, an overload start message from the core network node, where the overload start message is used for indicating that access of a terminal that supports only control plane cellular internet of things is not accepted.

For example, after the base station receives the radio resource control connection request sent by the UE, if the MME or the AMF is overloaded, and the UE is UE that supports only control plane cellular internet of things, the base station sends a radio resource control connection reject message to the UE, to reject current access of the UE.

It can be learned that, in this implementation, when the core network node is overloaded, the core network node may send the overload start message to the access network node, to indicate that access of a terminal that supports only control plane cellular internet of things is not accepted. Therefore, when determining that the terminal supports only control plane cellular internet of things, the access network node sends a radio resource control connection reject message to the terminal to reject access of the terminal.

In an example implementation, the second S1 interface application protocol message or the second NG interface application protocol message and the third S1 interface application protocol message or the third NG interface application protocol message do not establish or activate an S1 interface association or an NG interface association of the terminal.

It can be learned that, in this implementation, the second S1 interface application protocol message or the second NG interface application protocol message and the third S1 interface application protocol message or the third NG interface application protocol message do not establish or activate an S1 interface association or an NG interface association of the terminal. That is, when sending the second S1 interface application protocol message or the second NG interface application protocol message and the third S1 interface application protocol message or the third NG interface application protocol message to the core network node, the access network node does not establish the S1 interface association or the NG interface association about the terminal between a core network and an access network, or does not activate the S1 interface association or the NG interface association about the terminal between the core network and the access network. Therefore, in this implementation, even if the S1 interface association or the NG interface association about the terminal is not established or activated between the core network and the access network, the access network node can still send the identifier of the terminal to the core network node, and the core network node can still send, to the access network node, the third indication information indicating whether the terminal supports only control plane cellular internet of things or whether the terminal supports user plane cellular internet of things.

Figure 11:
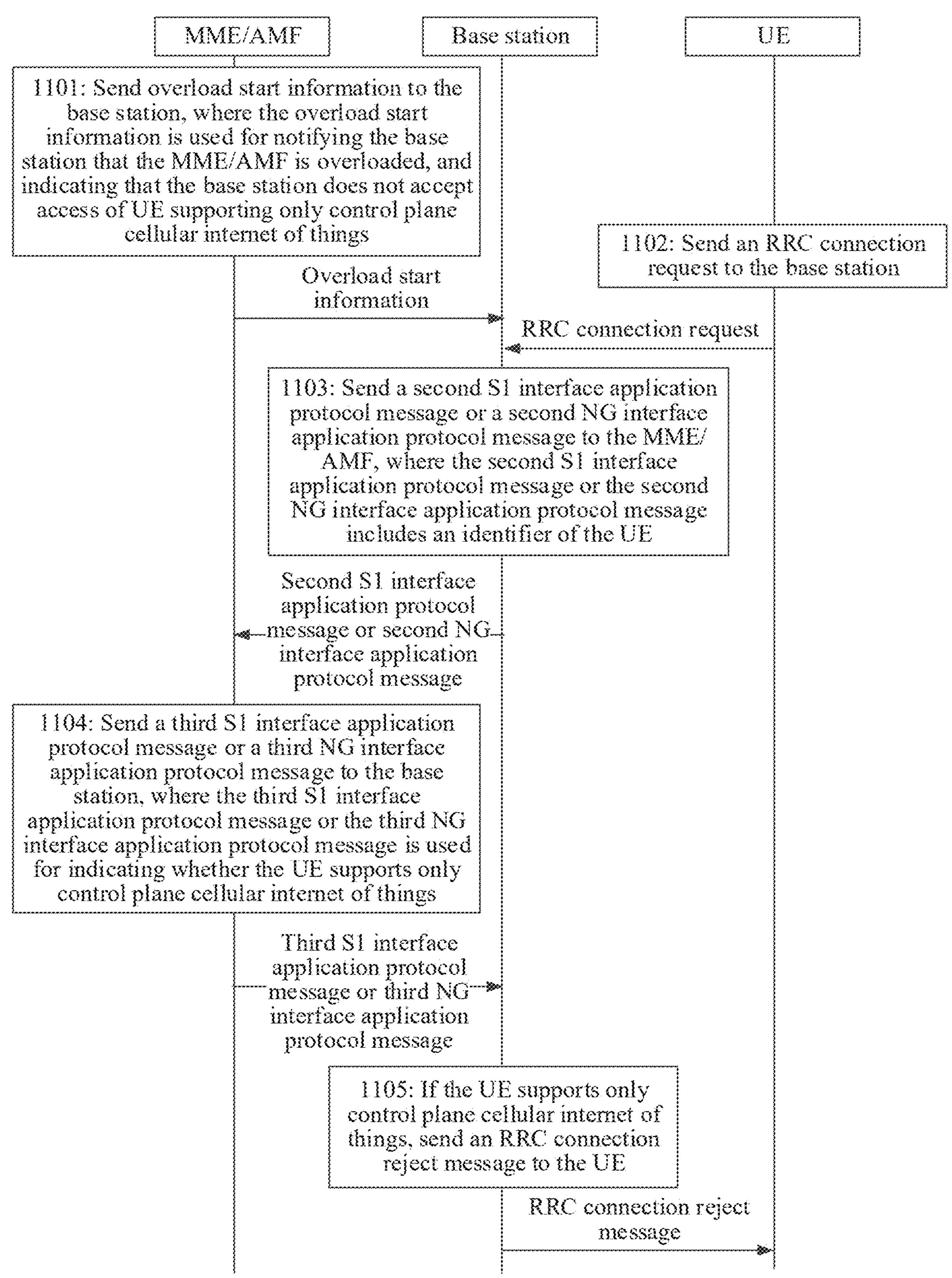
FIG. 11 is a schematic flowchart of still another communication method according to an embodiment of this application.

The following describes this embodiment in detail with reference to specific examples. FIG. 11 is a schematic flowchart of still another communication method according to an embodiment of this application. The method includes but is not limited to the following steps.

Step not An MME/AMF sends overload start information to a base station, where the overload start information is used for notifying the base station that the MME/AMF is overloaded, and indicating that the base station does not accept access of UE supporting only control plane cellular internet of things.

Step 1102: UE sends an RRC connection request to the base station.

Step 1103: The base station sends a second S1 interface application protocol message or a second NG interface application protocol message to the MME/AMF, where the second S1 interface application protocol message or the second NG interface application protocol message includes an identifier of the UE.

Step 1104: The MME/AMF sends a third S1 interface application protocol message or a third NG interface application protocol message to the base station, where the third S1 interface application protocol message or the third NG interface application protocol message is used for indicating whether the UE supports only control plane cellular internet of things.

Step 1105: If the UE supports only control plane cellular internet of things, the base station sends an RRC connection reject message to the UE.

The base station obtains, from a core network side, whether the UE is UE that supports only control plane cellular internet of things, and if the UE is UE that supports only control plane cellular internet of things, directly rejects access of the UE in a scenario in which a core network is overloaded.

Specifically, the MME or the AMF notifies the base station of overload start (Overload Start), requesting not to accept access of UE (CP only UE) that supports only control plane cellular internet of things. After the base station receives an RRC connection request (RRCConnectionRequest) sent by the UE, the base station sends a message to the MME or the AMF, where the message carries an S-TMSI of the UE. Then, the MME or the AMF sends a message to the base station, where the message carries an indication indicating whether the UE supports an UP CIoT solution or whether the UE is CP only UE. When the UE supports the UP CIoT solution or the UE is CP only UE, the base station sends an RRC reject message to the UE to reject the access of the UE.

It can be learned that, in this example, because the UE receives the RRC reject message, the UE does not update the information about the last cell that served the UE, so that the information about the last cell that served the UE stored on a UE side is consistent with that stored on the core network side, helping the base station page the UE.

Figure 12:
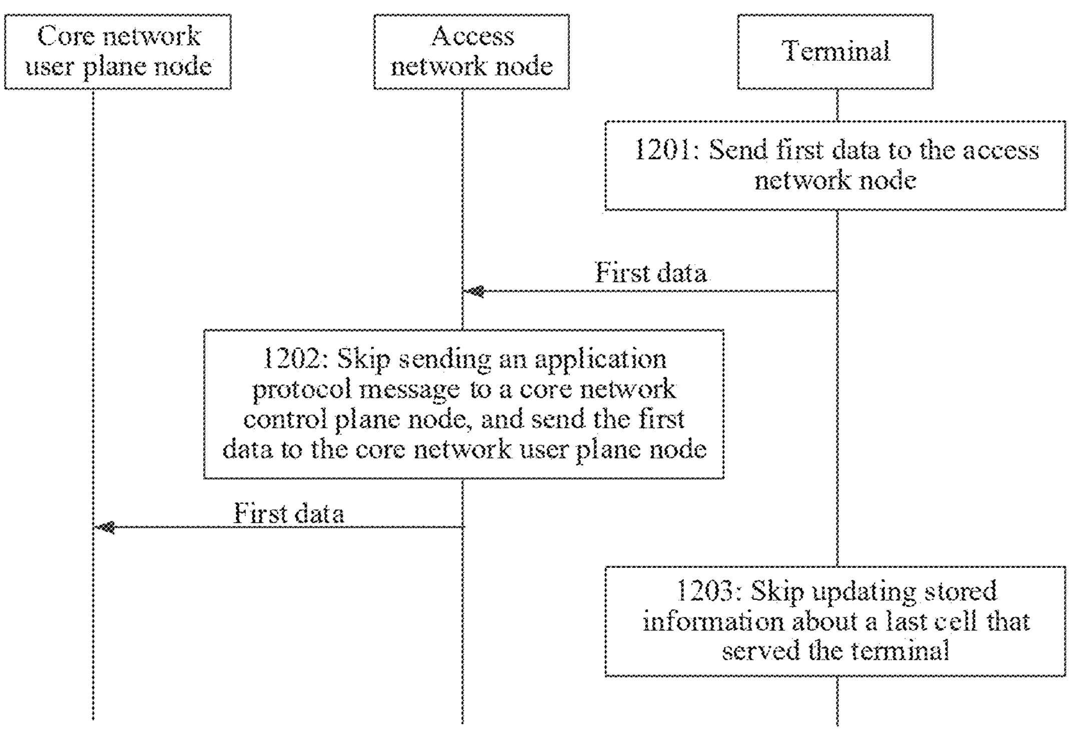
FIG. 12 is a schematic flowchart of still another communication method according to an embodiment of this application.

FIG. 12 is a schematic flowchart of still another communication method according to an embodiment of this application. The method includes but is not limited to the following steps.

Step 1201: A terminal sends first data to an access network node.

Step 1202: The access network node skips sending an application protocol message to a core network control plane node, and the access network node sends the first data to a core network user plane node.

Step 1203: The terminal skips updating stored information about a last cell that served the terminal.

Optionally, before step 1203, the access network node sends first indication information to the terminal, and the terminal performs step 1203 based on the first indication information.

The first data may be a non-access stratum protocol data unit NAS PDU (Non Access Stratum Protocol Data Unit) or user plane data.

The core network control plane node may be an access and mobility management function (AMF) or a mobility management entity (MME), and the core network user plane node may be a user plane function (UPF) or a serving gateway (SGW).

It can be learned that in this embodiment, the terminal quickly accesses the access network node, and then sends the first data to the access network node, so that the access network node does not send the application protocol message to the core network control plane node and sends the first data to the core network user plane node, thereby transmitting data to a core network. The access network node does not send the application protocol message to the core network control plane node, that is, the access network node does not send, to the core network control plane node, information about the cell that is quickly accessed by the terminal a current time. Therefore, the information about the last cell that served the terminal stored in the core network is still information about a cell that is accessed last time. Therefore, the terminal does not update the stored information about the last cell that served the terminal, that is, the terminal does not store the information about the cell that is quickly accessed the current time as the information about the last cell that served the terminal. Therefore, the information about the last cell that served the terminal stored on a terminal side is consistent with the information about the last cell that served the terminal stored on a network side. It is beneficial for the terminal to monitor a wake up signal in the last cell that served the terminal stored in the terminal, and further receive paging based on the wake up signal.

In an example implementation, before or during the sending first data to an access network node, the method further includes: triggering quick access to the access network node.

It can be learned that, in this implementation, before or during the sending first data to an access network node, the terminal triggers the quick access to the access network node, that is, the terminal quickly accesses the access network node, so that the first data is transmitted to the core network through quick access.

In an example implementation, the quick access includes small packet transmission, early data transmission, two-step random access, and resource reservation access.

It can be learned that, in this implementation, the quick access includes the small packet transmission, the early data transmission, the two-step random access, and the resource reservation access, so that the terminal may transmit the first data to the core network in a plurality of manners.

The foregoing mainly describes the solutions in embodiments of this application from a perspective of interaction between network elements. It may be understood that to implement the foregoing functions, the access network node and the terminal include corresponding hardware structures and/or software modules for implementing the functions. A person skilled in the art should be easily aware that units, algorithms, and steps in the examples described with reference to embodiments disclosed in this specification can be implemented in a form of hardware or a combination of hardware and computer software in this application. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

Figure 13:
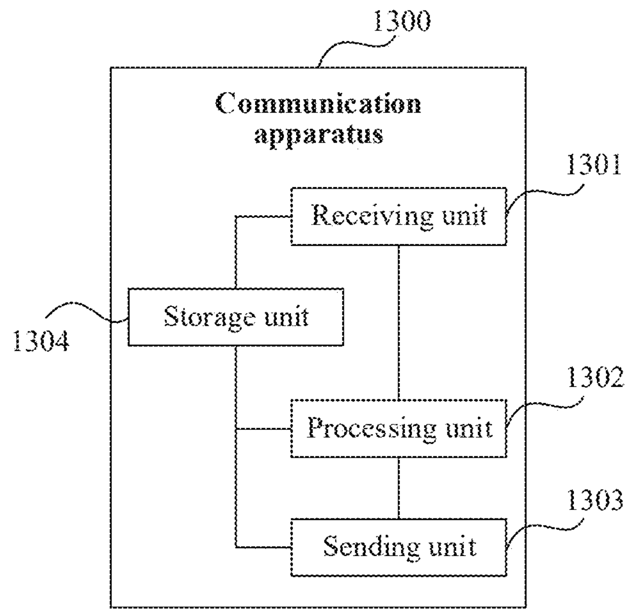
FIG. 13 is a schematic diagram of a structure of a communication apparatus according to an embodiment of this application.

FIG. 13 is a schematic diagram of a structure of a communication apparatus according to an embodiment of this application. The communication apparatus 1300 may include a receiving unit 1301 and a processing unit 1302. The communication apparatus 1300 is applied to a terminal. Detailed descriptions of the units are as follows:

The receiving unit 1301 is configured to receive a first message from an access network node.

The processing unit 1302 is configured to process first information based on the first message, where the first information includes information that needs to be stored in the terminal and a core network node; and/or process first data based on the first message, where the first data includes data sent to the access network node before the first message from the access network node is received.

In an example implementation, the first message includes first indication information, and the first indication information indicates at least one of the following: radio resource control connection reject; radio resource control connection failure; radio resource control connection release; no radio resource control connection is established; no connection to the core network node is established; the core network node is unaware of current access of the terminal; access failure; access reject; and the access network node does not send the first data to the core network node.

In an example implementation, the processing first data includes retransmitting the first data.

In an example implementation, the first information includes information about a last cell that served the terminal.

In an example implementation, the processing first information includes: skipping updating the information about the last cell that served the terminal; or saving information about a cell of the access network node during last access of the terminal as the information about the last cell that served the terminal.

In an example implementation, the receiving unit 1301 is further configured to: if the terminal is located in the cell corresponding to the information about the last cell that served the terminal, monitor a wake up signal, and receive paging based on the wake up signal; and if the terminal is located in a first cell, skip monitoring the wake up signal, where the first cell does not include the cell corresponding to the information about the last cell that served the terminal.

In an example implementation, the first message includes a radio resource control release message.

In an example implementation, the first indication information includes a radio resource control release cause.

In an example implementation, the apparatus further includes: a sending unit 1303, configured to send a second message to the access network node, where the second message includes second indication information, and the second indication information indicates whether the terminal supports only control plane cellular internet of things or whether the terminal supports user plane cellular internet of things.

In an example implementation, the receiving unit 1301 is specifically configured to: if the core network node is overloaded and the terminal supports only control plane cellular internet of things or the terminal does not support user plane cellular internet of things, receive the radio resource control release message from the access network node.

It needs to be noted that for the implementation of the units, reference may be correspondingly made to corresponding description of the method embodiment in FIG. 6 or FIG. 7. Certainly, the communication apparatus 1300 provided in embodiments of this application includes but is not limited to the foregoing unit modules. For example, the communication apparatus 1300 may further include a storage unit 1304. The storage unit 1304 may be configured to store program code and data that are of the communication apparatus 1300.

In the communication apparatus 1300 described in FIG. 13, the first message is received from the access network node, and then the first information is processed based on the first message. Because the first information includes the information that needs to be stored in the terminal and the core network node, when the first information is information about a last cell that served the terminal, the information about the last cell that served the terminal stored in the terminal is processed, so that the information about the last cell that served the terminal stored in the terminal is consistent with the information about the last cell that served the terminal stored in the core network node, which helps the terminal monitor a wake up signal in the last cell that served the terminal stored in the terminal, and then receive paging based on the wake up signal; or the first data is processed based on the first message. Because the first data includes the data sent by the terminal to the access network node before the first message from the access network node is received, if the first data is not successfully sent, the first data may be retransmitted to the access network node based on the first message, thereby ensuring that the first data can be successfully sent.

Figure 14:
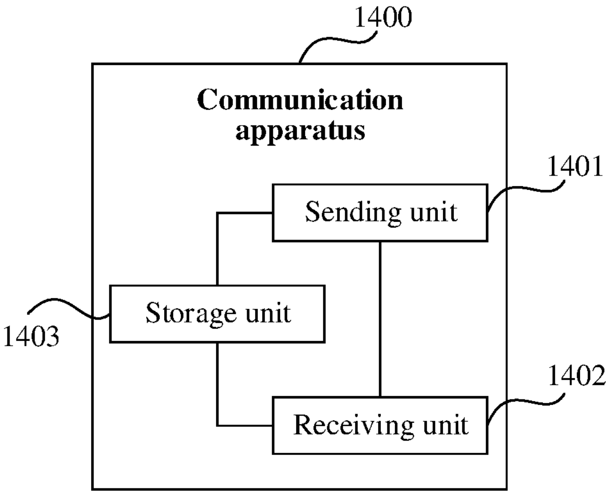
FIG. 14 is a schematic diagram of a structure of another communication apparatus according to an embodiment of this application.

FIG. 14 is a schematic diagram of a structure of another communication apparatus according to an embodiment of this application. The communication apparatus 1400 may include a sending unit 1401. The communication apparatus 1400 is applied to an access network node. Detailed descriptions of the units are as follows:

The sending unit 1401 is configured to send a first message to a terminal, where the first message is used by the terminal to process first information, and the first information includes information that needs to be stored in the terminal and a core network node; and/or the first message is used by the terminal to process first data, and the first data includes data received from the terminal before the first message is sent to the terminal.

In an example implementation, the first message includes first indication information, and the first indication information indicates at least one of the following: radio resource control connection reject; radio resource control connection failure; radio resource control connection release; no radio resource control connection is established; no connection to the core network node is established; the core network node is unaware of current access of the terminal; access failure; access reject; and the access network node does not send the first data to the core network node.

In an example implementation, the processing first data includes retransmitting the first data.

In an example implementation, the first information includes information about a last cell that served the terminal.

In an example implementation, the processing first information includes: skipping updating the information about the last cell that served the terminal; or saving information about a cell of the access network node during last access of the terminal as the information about the last cell that served the terminal.

In an example implementation, the apparatus further includes: a receiving unit 1402, configured to: after the first message is sent to the terminal, receive a paging message from the core network node, where the paging message includes the information about the last cell that served the terminal; and the sending unit 1401 is further configured to use a wake up signal during paging of the terminal in the cell corresponding to the information about the last cell that served the terminal, and skip using the wake up signal during paging of the terminal in a first cell, where the wake up signal is used for indicating the terminal to receive paging, and the first cell does not include the cell corresponding to the information about the last cell that served the terminal.

In an example implementation, the first message includes a radio resource control release message.

In an example implementation, the first indication information includes a radio resource control release cause.

In an example implementation, the receiving unit 1402 is further configured to receive an overload start message from the core network node, where the overload start message is used for indicating that access of a terminal that supports only control plane cellular internet of things is not accepted; and receive a second message from the terminal, where the second message includes second indication information, and the second indication information indicates whether the terminal supports only control plane cellular internet of things or whether the terminal supports user plane cellular internet of things.

In an example implementation, the sending unit 1401 is specifically configured to: if the terminal supports only control plane cellular internet of things or the terminal does not support user plane cellular internet of things, send the radio resource control release message to the terminal.

It needs to be noted that for the implementation of the units, reference may be correspondingly made to corresponding description of the method embodiment in FIG. 6 or FIG. 7. Certainly, the communication apparatus 1400 provided in embodiments of this application includes but is not limited to the foregoing unit modules. For example, the communication apparatus 1400 may further include a storage unit 1403. The storage unit 1403 may be configured to store program code and data that are of the communication apparatus 1400.

In the communication apparatus 1400 described in FIG. 14, the first message is sent to the terminal, where the first message is used by the terminal to process the first information, and the first information includes the information that needs to be stored in the terminal and the core network node. Because the first information includes the information that needs to be stored in the terminal and the core network node, when the first information is information about a last cell that served the terminal, the terminal processes the information about the last cell that served the terminal stored in the terminal, so that the information about the last cell that served the terminal stored in the terminal is consistent with the information about the last cell that served the terminal stored in the core network node, which helps the terminal monitor a wake up signal in the last cell that served the terminal stored in the terminal, and then receive paging based on the wake up signal; and/or the first message is used by the terminal to process first data, and the first data includes data received from the terminal before the first message is sent to the terminal. Because the first data includes the data sent by the terminal to the access network node before the first message from the access network node is received, if the first data is not successfully sent, the first data may be retransmitted to the access network node based on the first message, thereby ensuring that the first data can be successfully sent.

Figure 15:
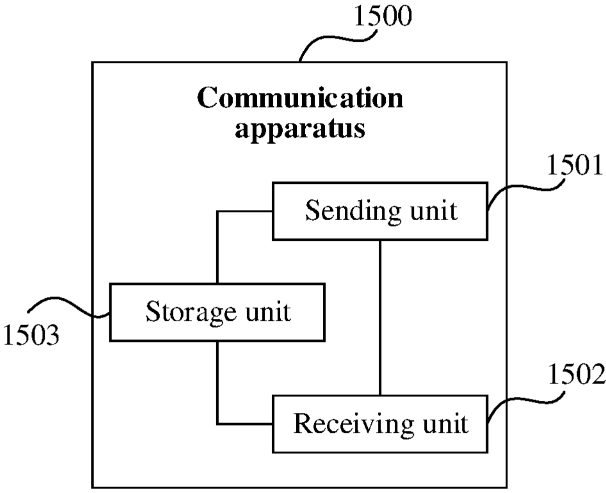
FIG. 15 is a schematic diagram of a structure of still another communication apparatus according to an embodiment of this application.

FIG. 15 is a schematic diagram of a structure of still another communication apparatus according to an embodiment of this application. The communication apparatus 1500 may include a sending unit 1501. The communication apparatus 1500 is applied to an access network node. Detailed descriptions of the units are as follows:

The sending unit 1501 is configured to send a radio resource control release message to a terminal, and send a first S1 interface application protocol message or a first NG interface application protocol message to a core network node, where the first S1 interface application protocol message or the first NG interface application protocol message includes information about a cell of the access network node during current access of the terminal.

In an example implementation, the first S1 interface application protocol message or the first NG interface application protocol message does not establish or activate an S1 interface association or an NG interface association of the terminal.

In an example implementation, the apparatus further includes: a receiving unit 1502, configured to receive an overload start message from the core network node, where the overload start message is used for indicating that access of a terminal that supports only control plane cellular internet of things is not accepted; and receive a second message from the terminal, where the second message includes second indication information, and the second indication information indicates whether the terminal supports only control plane cellular internet of things or whether the terminal supports user plane cellular internet of things.

In an example implementation, the sending unit 1501 is specifically configured to: if the terminal supports only control plane cellular internet of things or the terminal does not support user plane cellular internet of things, send the radio resource control release message to the terminal, and send the first S1 interface application protocol message or the first NG interface application protocol message to the core network node.

In an example implementation, the radio resource control release message includes first indication information, and the first indication information indicates at least one of the following: radio resource control connection reject; radio resource control connection failure; radio resource control connection release; no radio resource control connection is established; no connection to the core network node is established; the core network node is unaware of current access of the terminal; access failure; access reject; and the access network node does not send first data to the core network node, where the first data includes data sent by the terminal to the access network node.

In an example implementation, the first indication information is used by the terminal to process the first data, and the first data includes data received from the terminal before the radio resource control release message is sent to the terminal.

In an example implementation, the first S1 interface application protocol message or the first NG interface application protocol message further includes an identifier of the terminal.

In an example implementation, the first S1 interface application protocol message or the first NG interface application protocol message includes retrieve UE information Retrieve UE Information.

It needs to be noted that for the implementation of the units, reference may be correspondingly made to corresponding description of the method embodiment in FIG. 8 or FIG. 9. Certainly, the communication apparatus 1500 provided in embodiments of this application includes but is not limited to the foregoing unit modules. For example, the communication apparatus 1500 may further include a storage unit 1503. The storage unit 1503 may be configured to store program code and data that are of the communication apparatus 1500.

In the communication apparatus 1500 described in FIG. 15, the radio resource control release message is sent to the terminal. After receiving the radio resource control release message, the terminal releases a radio resource control connection, and updates information about a last cell that served the terminal stored in the terminal, that is, saves the information about the cell of the access network node during current access of the terminal as the information about the last cell that served the terminal. In addition, the information about the cell of the access network node during current access of the terminal is further sent to the core network node by using the first S1 interface application protocol message or the first NG interface application protocol message. In this way, the information about the last cell that served the terminal stored in the terminal is consistent with information about a last cell that served the terminal stored in the core network node. It is beneficial for the terminal to monitor a wake up signal in the last cell that served the terminal stored in the terminal, and further receive paging based on the wake up signal.

Figure 16:
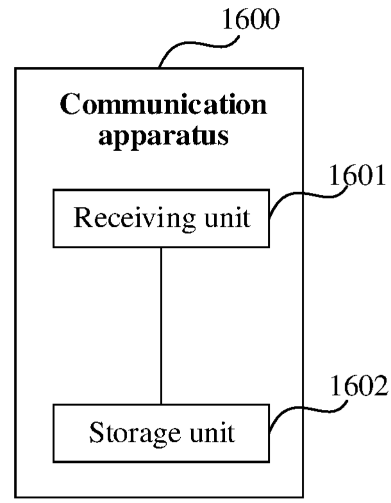
FIG. 16 is a schematic diagram of a structure of still another communication apparatus according to an embodiment of this application.

FIG. 16 is a schematic diagram of a structure of still another communication apparatus according to an embodiment of this application. The communication apparatus 1600 may include a receiving unit 1601 and a storage unit 1602. The communication apparatus 1600 is applied to a core network node. Detailed descriptions of the units are as follows:

The receiving unit 1601 is configured to receive a first S1 interface application protocol message or a first NG interface application protocol message from an access network node, where the first S1 interface application protocol message or the first NG interface application protocol message includes information about a cell of the access network node during current access of a terminal, and the first S1 interface application protocol message or the first NG interface application protocol message does not establish or activate an S1 interface association or an NG interface association of the terminal.

The storage unit 1602 is configured to store the information about the cell of the access network node during current access of the terminal.

It needs to be noted that for the implementation of the units, reference may be correspondingly made to corresponding description of the method embodiment in FIG. 8 or FIG. 9. The storage unit 1602 may further be configured to store program code and data that are of the communication apparatus 1600.

In the communication apparatus 1600 described in FIG. 16, the first S1 interface application protocol message or the first NG interface application protocol message does not establish or activate the S1 interface association or the NG interface association of the terminal. That is, when sending the first S1 interface application protocol message or the first NG interface application protocol message to the core network node, the access network node does not establish an S1 interface association or an NG interface association about the terminal between a core network and an access network, or does not activate the S1 interface association or the NG interface association about the terminal between the core network and the access network. Therefore, in this implementation, even if the S1 interface association or the NG interface association about the terminal is not established or activated between the core network and the access network, the access network node can still send, to the core network node, the information about the cell of the access network node during current access of the terminal.

Figure 17:
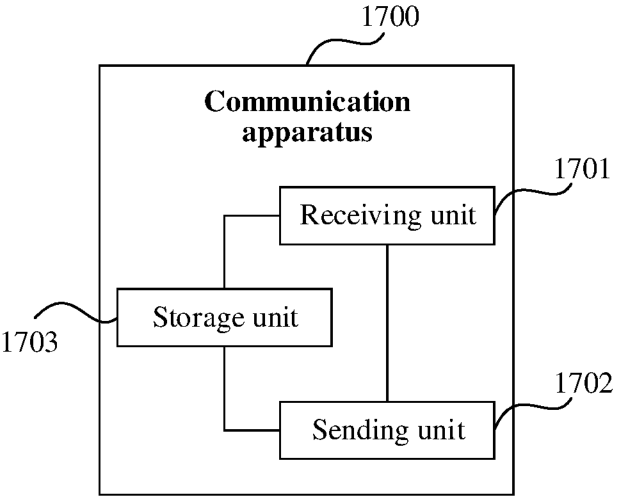
FIG. 17 is a schematic diagram of a structure of still another communication apparatus according to an embodiment of this application.

FIG. 17 is a schematic diagram of a structure of still another communication apparatus according to an embodiment of this application. The communication apparatus 1700 may include a receiving unit 1701 and a sending unit 1702. The communication apparatus 1700 is applied to an access network node. Detailed descriptions of the units are as follows:

The receiving unit 1701 is configured to receive a radio resource control connection request message from a terminal.

The sending unit 1702 is configured to send a second S1 interface application protocol message or a second NG interface application protocol message to a core network node, where the second S1 interface application protocol message or the second NG interface application protocol message includes an identifier of the terminal.

The receiving unit 1701 is further configured to receive a third S1 interface application protocol message or a third NG interface application protocol message from the core network node, where the third S1 interface application protocol message or the third NG interface application protocol message includes third indication information, and the third indication information indicates whether the terminal supports only control plane cellular internet of things or whether the terminal supports user plane cellular internet of things.

The sending unit 1702 is further configured to: if the terminal supports only control plane cellular internet of things or the terminal does not support user plane cellular internet of things, send a radio resource control connection reject message to the terminal.

In an example implementation, the receiving unit 1701 is further configured to receive an overload start message from the core network node, where the overload start message is used for indicating that access of a terminal that supports only control plane cellular internet of things is not accepted.

It needs to be noted that for the implementation of the units, reference may be correspondingly made to corresponding description of the method embodiment in FIG. 10 or FIG. 11. Certainly, the communication apparatus 1700 provided in embodiments of this application includes but is not limited to the foregoing unit modules. For example, the communication apparatus 1700 may further include a storage unit 1703. The storage unit 1703 may be configured to store program code and data that are of the communication apparatus 1700.

In the communication apparatus 1700 described in FIG. 17, after the radio resource control connection request message of the terminal is received, the second S1 interface application protocol message or the second NG interface application protocol message is sent to the core network node, to notify the core network node of the identifier of the terminal. The core network node may determine, by using the identifier of the terminal, whether the terminal is a terminal that supports only control plane cellular internet of things or whether the terminal is a terminal that supports user plane cellular internet of things. Then, the core network node sends the third S1 interface application protocol message or the third NG interface application protocol message to the access network node, and notifies the access network node of a result of whether the terminal is a terminal that supports only control plane cellular internet of things or whether the terminal is a terminal that supports user plane cellular internet of things. If the terminal supports only control plane cellular internet of things or the terminal does not support user plane cellular internet of things, the access network node directly rejects the radio resource control connection request of the terminal. Because the radio resource control connection request initiated by the terminal is rejected, the terminal fails to access the network, and the terminal does not update the information of the last cell that served the terminal stored in the terminal. Therefore, the information about the last cell that served the terminal stored on a terminal side is consistent with the information about the last cell that served the terminal stored on a network side. It is beneficial for the terminal to monitor a wake up signal in the last cell that served the terminal stored in the terminal, and further receive paging based on the wake up signal.

Figure 18:
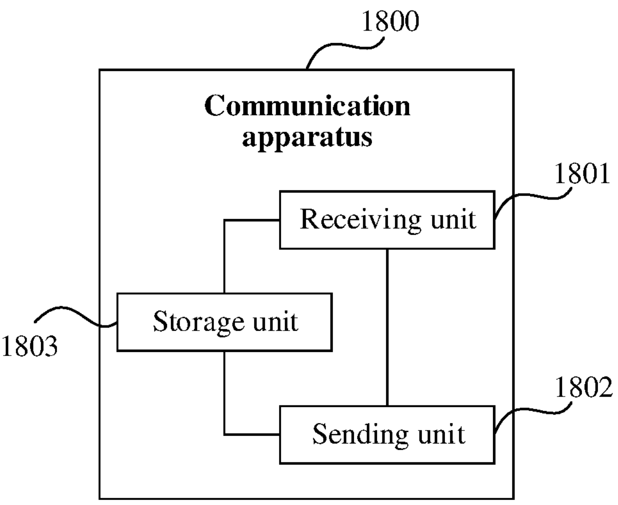
FIG. 18 is a schematic diagram of a structure of still another communication apparatus according to an embodiment of this application.

FIG. 18 is a schematic diagram of a structure of still another communication apparatus according to an embodiment of this application. The communication apparatus 1800 may include a receiving unit 1801 and a sending unit 1802. The communication apparatus 1800 is applied to a core network node. Detailed descriptions of the units are as follows:

The receiving unit 1801 is configured to receive a second S1 interface application protocol message or a second NG interface application protocol message from an access network node, where the second S1 interface application protocol message or the second NG interface application protocol message includes an identifier of a terminal.

The sending unit 1802 is configured to send a third S1 interface application protocol message or a third NG interface application protocol message to the access network node, where the third S1 interface application protocol message or the third NG interface application protocol message includes third indication information, and the third indication information indicates whether the terminal supports only control plane cellular internet of things or whether the terminal supports user plane cellular internet of things.

In an example implementation, the second S1 interface application protocol message or the second NG interface application protocol message and the third S1 interface application protocol message or the third NG interface application protocol message do not establish or activate an S1 interface association or an NG interface association of the terminal.

It needs to be noted that for the implementation of the units, reference may be correspondingly made to corresponding description of the method embodiment in FIG. in or FIG. 11. Certainly, the communication apparatus 1800 provided in embodiments of this application includes but is not limited to the foregoing unit modules. For example, the communication apparatus 1800 may further include a storage unit 1803. The storage unit 1803 may be configured to store program code and data that are of the communication apparatus 1800.

In the communication apparatus 1800 described in FIG. 18, the access network node sends the identifier of the terminal to the core network node by node using the second S1 interface application protocol message or the second NG interface application protocol message. The core network node may notify, by using the third S1 interface application protocol message or the third NG interface application protocol message, the access network node whether the terminal supports only control plane cellular internet of things or whether the terminal supports user plane cellular internet of things.

Figure 19:
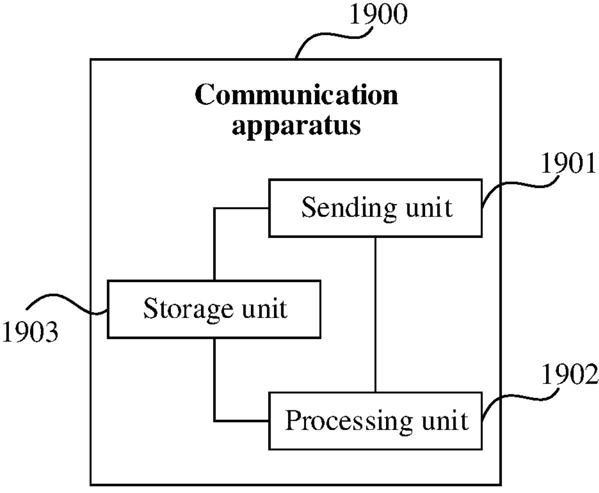
FIG. 19 is a schematic diagram of a structure of still another communication apparatus according to an embodiment of this application.

FIG. 19 is a schematic diagram of a structure of still another communication apparatus according to an embodiment of this application. The communication apparatus 1900 may include a sending unit 1901 and a processing unit 1902. The communication apparatus 1900 is applied to a terminal. Detailed descriptions of the units are as follows:

The sending unit 1901 is configured to send first data to an access network node, so that the access network node does not send an application protocol message to a core network control plane node and sends the first data to a core network user plane node.

The processing unit 1902 is configured to skip updating the stored information about the last cell that served.

In an example implementation, before the sending the first data to the access network node, the sending unit 1901 is further configured to trigger quick access to the access network node.

In an example implementation, the quick access includes small packet transmission, early data transmission, two-step random access, and resource reservation access.

It needs to be noted that for the implementation of the units, reference may be correspondingly made to corresponding description of the method embodiment in FIG. 12. Certainly, the communication apparatus 1900 provided in embodiments of this application includes but is not limited to the foregoing unit modules. For example, the communication apparatus 1900 may further include a storage unit 1903. The storage unit 1903 may be configured to store program code and data that are of the communication apparatus 1900.

In the communication apparatus 1900 described in FIG. 19, the first data is sent to the access network node, so that the access network node does not send the application protocol message to the core network control plane node and sends the first data to the core network user plane node, thereby transmitting data to a core network. The access network node does not send the application protocol message to the core network control plane node, that is, the access network node does not send, to the core network control plane node, information about the cell that is quickly accessed by the terminal a current time. Therefore, the information about the last cell that served the terminal stored in the core network is still information about a cell that is accessed last time. Therefore, the terminal does not update the stored information about the last cell that served the terminal, that is, the terminal does not store the information about the cell that is quickly accessed the current time as the information about the last cell that served the terminal. Therefore, the information about the last cell that served the terminal stored on a terminal side is consistent with the information about the last cell that served the terminal stored on a network side. It is beneficial for the terminal to monitor a wake up signal in the last cell that served the terminal stored in the terminal, and further receive paging based on the wake up signal.

Figure 20:
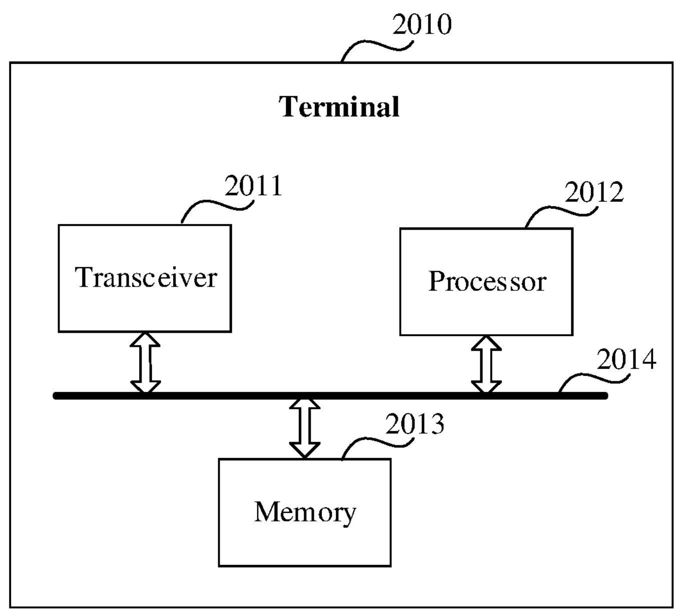
FIG. 20 is a schematic diagram of a structure of a terminal according to an embodiment of this application.

FIG. 20 is a schematic diagram of a structure of a terminal according to an embodiment of this application. The terminal 2010 includes a transceiver 2011, a processor 2012, and a memory 2013. The transceiver 2011, the processor 2012, and the memory 2013 are connected to each other by using a bus 2014.

The memory 2013 includes but is not limited to a random access memory (random access memory, RAM), a read-only memory (ROM), an erasable programmable read-only memory (EPROM), or a compact disc read-only memory (CD-ROM). The memory 2013 is configured to store related instructions and data.

The transceiver 2011 is configured to send and receive data.

The processor 2012 may be one or more central processing units (CPU). When the processor 2012 is one CPU, the CPU may be a single-core CPU or a multi-core CPU.

The processor 2012 in the terminal 2010 is configured to read program code stored in the memory 2013 to perform the following operations: receiving a first message from an access network node; and processing first information based on the first message, where the first information includes information that needs to be stored in the terminal and a core network node; and/or processing first data based on the first message, where the first data includes data sent to the access network node before the first message from the access network node is received.

It needs to be noted that for the implementation of the operations, reference may be correspondingly made to corresponding description of the method embodiment in FIG. 6 or FIG. 7.

In the terminal 2010 described in FIG. 20, the first message is received from the access network node, and then the first information is processed based on the first message. Because the first information includes the information that needs to be stored in the terminal and the core network node, when the first information is information about a last cell that served the terminal, the information about the last cell that served the terminal stored in the terminal is processed, so that the information about the last cell that served the terminal stored in the terminal is consistent with the information about the last cell that served the terminal stored in the core network node, which helps the terminal monitor a wake up signal in the last cell that served the terminal stored in the terminal, and then receive paging based on the wake up signal; or the first data is processed based on the first message. Because the first data includes the data sent by the terminal to the access network node before the first message from the access network node is received, if the first data is not successfully sent, the first data may be retransmitted to the access network node based on the first message, thereby ensuring that the first data can be successfully sent.

Alternatively, the processor 2012 in the terminal 2010 is configured to read program code stored in the memory 2013 to perform the following operations: sending first data to an access network node, so that the access network node does not send an application protocol message to a core network control plane node and sends the first data to a core network user plane node; and skipping updating stored information about a last cell that served the terminal.

It needs to be noted that for the implementation of the operations, reference may be correspondingly made to corresponding description of the method embodiment in FIG. 12.

In the terminal 2010 described in FIG. 20, the terminal quickly accesses the access network node, and then sends the first data to the access network node, so that the access network node does not send the application protocol message to the core network control plane node and sends the first data to the core network user plane node, thereby transmitting data to a core network. The access network node does not send the application protocol message to the core network control plane node, that is, the access network node does not send, to the core network control plane node, information about the cell that is quickly accessed by the terminal a current time. Therefore, the information about the last cell that served the terminal stored in the core network is still information about a cell that is accessed last time. Therefore, the terminal does not update the stored information about the last cell that served the terminal, that is, the terminal does not store the information about the cell that is quickly accessed the current time as the information about the last cell that served the terminal. Therefore, the information about the last cell that served the terminal stored on a terminal side is consistent with the information about the last cell that served the terminal stored on a network side. It is beneficial for the terminal to monitor a wake up signal in the last cell that served the terminal stored in the terminal, and further receive paging based on the wake up signal.

Figure 21:
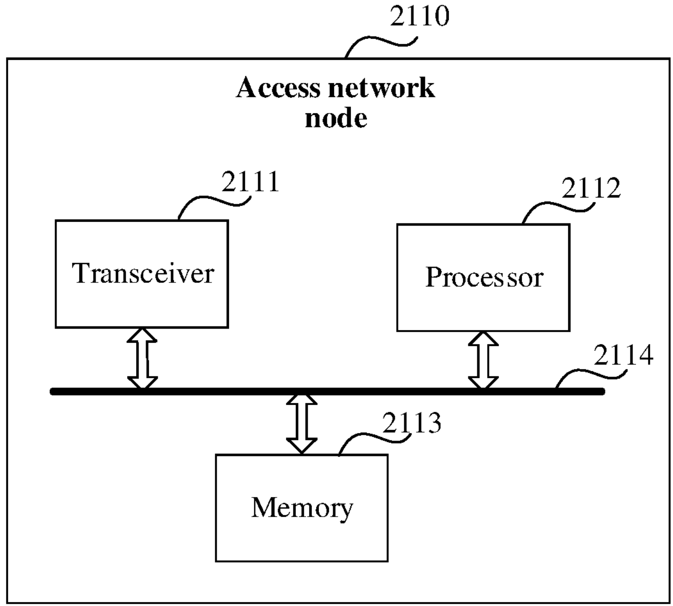
FIG. 21 is a schematic diagram of a structure of an access network node according to an embodiment of this application.

FIG. 21 is a schematic diagram of a structure of an access network node according to an embodiment of this application. The access network node 2110 includes a transceiver 2111, a processor 2112, and a memory 2113. The transceiver 2111, the processor 2112, and the memory 2113 are connected to each other by using a bus 2114.

The memory 2113 includes but is not limited to a random access memory (RAM), a read-only memory (ROM), an erasable programmable read-only memory (EPROM), or a compact disc read-only memory (CD-ROM). The memory 2113 is configured to store related instructions and data.

The transceiver 2111 is configured to send and receive data.

The processor 2112 may be one or more central processing units (CPU). When the processor 2112 is one CPU, the CPU may be a single-core CPU or a multi-core CPU.

The processor 2112 in the access network node 2110 is configured to read program code stored in the memory 2113 to perform the following operations: sending a first message to a terminal, where the first message is used by the terminal to process first information, and the first information includes information that needs to be stored in the terminal and a core network node; and/or the first message is used by the terminal to process first data, and the first data includes data received from the terminal before the first message is sent to the terminal.

It needs to be noted that for the implementation of the operations, reference may be correspondingly made to corresponding description of the method embodiment in FIG. 6 or FIG. 7.

In the access network node 2110 described in FIG. 21, the first message is sent to the terminal, where the first message is used by the terminal to process the first information, and the first information includes the information that needs to be stored in the terminal and the core network node. Because the first information includes the information that needs to be stored in the terminal and the core network node, when the first information is information about a last cell that served the terminal, the terminal processes the information about the last cell that served the terminal stored in the terminal, so that the information about the last cell that served the terminal stored in the terminal is consistent with the information about the last cell that served the terminal stored in the core network node, which helps the terminal monitor a wake up signal in the last cell that served the terminal stored in the terminal, and then receive paging based on the wake up signal; and/or the first message is used by the terminal to process first data, and the first data includes data received from the terminal before the first message is sent to the terminal. Because the first data includes the data sent by the terminal to the access network node before the first message from the access network node is received, if the first data is not successfully sent, the first data may be retransmitted to the access network node based on the first message, thereby ensuring that the first data can be successfully sent.

Alternatively, the processor 1912 in the access network node 1910 is configured to read program code stored in the memory 1913 to perform the following operations: sending a radio resource control release message to a terminal, and sending a first S1 interface application protocol message or a first NG interface application protocol message to a core network node, where the first S1 interface application protocol message or the first NG interface application protocol message includes information about a cell of the access network node during current access of the terminal.

It needs to be noted that for the implementation of the operations, reference may be correspondingly made to corresponding description of the method embodiment in FIG. 8 or FIG. 9.

In the access network node 2110 described in FIG. 21, the radio resource control release message is sent to the terminal. After receiving the radio resource control release message, the terminal releases a radio resource control connection, and updates information about a last cell that served the terminal stored in the terminal, that is, saves the information about the cell of the access network node during current access of the terminal as the information about the last cell that served the terminal. In addition, the information about the cell of the access network node during current access of the terminal is further sent to the core network node by using the first S1 interface application protocol message or the first NG interface application protocol message. In this way, the information about the last cell that served the terminal stored in the terminal is consistent with information about a last cell that served the terminal stored in the core network node. It is beneficial for the terminal to monitor a wake up signal in the last cell that served the terminal stored in the terminal, and further receive paging based on the wake up signal.

Alternatively, the processor 2112 in the access network node 2110 is configured to read program code stored in the memory 2113 to perform the following operations: receiving a radio resource control connection request message from a terminal; sending a second S1 interface application protocol message or a second NG interface application protocol message to a core network node, where the second S1 interface application protocol message or the second NG interface application protocol message includes an identifier of the terminal; receiving a third S1 interface application protocol message or a third NG interface application protocol message from the core network node, where the third S1 interface application protocol message or the third NG interface application protocol message includes third indication information, and the third indication information indicates whether the terminal supports only control plane cellular internet of things or whether the terminal supports user plane cellular internet of things; and if the terminal supports only control plane cellular internet of things or the terminal does not support user plane cellular internet of things, sending a radio resource control connection reject message to the terminal.

It needs to be noted that for the implementation of the operations, reference may be correspondingly made to corresponding description of the method embodiment in FIG. 10 or FIG. 11.

In the access network node 2110 described in FIG. 21, after the radio resource control connection request message of the terminal is received, the second S1 interface application protocol message or the second NG interface application protocol message is sent to the core network node, to notify the core network node of the identifier of the terminal. The core network node may determine, by using the identifier of the terminal, whether the terminal is a terminal that supports only control plane cellular internet of things or whether the terminal is a terminal that supports user plane cellular internet of things. Then, the core network node sends the third S1 interface application protocol message or the third NG interface application protocol message to the access network node, and notifies the access network node of a result of whether the terminal is a terminal that supports only control plane cellular internet of things or whether the terminal is a terminal that supports user plane cellular internet of things. If the terminal supports only control plane cellular internet of things or the terminal does not support user plane cellular internet of things, the access network node directly rejects the radio resource control connection request of the terminal. Because the radio resource control connection request initiated by the terminal is rejected, the terminal fails to access the network, and the terminal does not update the information of the last cell that served the terminal stored in the terminal. Therefore, the information about the last cell that served the terminal stored on a terminal side is consistent with the information about the last cell that served the terminal stored on a network side. It is beneficial for the terminal to monitor a wake up signal in the last cell that served the terminal stored in the terminal, and further receive paging based on the wake up signal.

Figure 22:
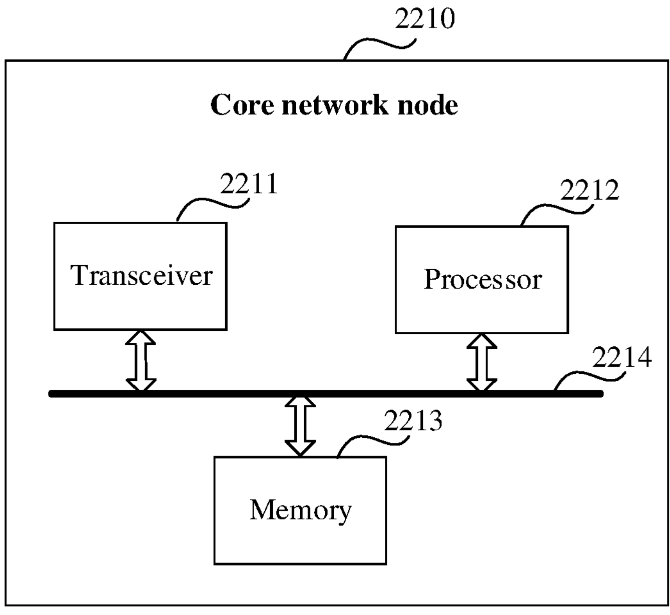
FIG. 22 is a schematic diagram of a structure of a core network node according to an embodiment of this application.

FIG. 22 is a schematic diagram of a structure of a core network node according to an embodiment of this application. The core network node 2210 includes a transceiver 2211, a processor 2212, and a memory 2213. The transceiver 2211, the processor 2212, and the memory 2213 are connected to each other by using a bus 2214.

The memory 2213 includes but is not limited to a random access memory (RAM), a read-only memory (ROM), an erasable programmable read-only memory (EPROM), or a compact disc read-only memory (CD-ROM). The memory 2213 is configured to store related instructions and data.

The transceiver 2211 is configured to send and receive data.

The processor 2212 may be one or more central processing units (CPU). When the processor 2212 is one CPU, the CPU may be a single-core CPU or a multi-core CPU.

The processor 2212 in the core network node 2210 is configured to read program code stored in the memory 2213 to perform the following operations: receiving a first S1 interface application protocol message or a first NG interface application protocol message from an access network node, where the first S1 interface application protocol message or the first NG interface application protocol message includes information about a cell of the access network node during current access of a terminal, and the first S1 interface application protocol message or the first NG interface application protocol message does not establish or activate an S1 interface association or an NG interface association of the terminal; and storing the information about the cell of the access network node during current access of the terminal.

It needs to be noted that for the implementation of the operations, reference may be correspondingly made to corresponding description of the method embodiment in FIG. 8 or FIG. 9.

In the core network node 2210 described in FIG. 22, the first S1 interface application protocol message or the first NG interface application protocol message does not establish or activate the S1 interface association or the NG interface association of the terminal. That is, when sending the first S1 interface application protocol message or the first NG interface application protocol message to the core network node, the access network node does not establish an S1 interface association or an NG interface association about the terminal between a core network and an access network, or does not activate the S1 interface association or the NG interface association about the terminal between the core network and the access network. Therefore, in this implementation, even if the S1 interface association or the NG interface association about the terminal is not established or activated between the core network and the access network, the access network node can still send, to the core network node, the information about the cell of the access network node during current access of the terminal.

Alternatively, the processor 2212 in the core network node 2210 is configured to read program code stored in the memory 2213 to perform the following operations: receiving a second S1 interface application protocol message or a second NG interface application protocol message from an access network node, where the second S1 interface application protocol message or the second NG interface application protocol message includes an identifier of a terminal; and sending a third S1 interface application protocol message or a third NG interface application protocol message to the access network node, where the third S1 interface application protocol message or the third NG interface application protocol message includes third indication information, and the third indication information indicates whether the terminal supports only control plane cellular internet of things or whether the terminal supports user plane cellular internet of things.

It needs to be noted that for the implementation of the operations, reference may be correspondingly made to corresponding description of the method embodiment in FIG. 10 or FIG. 11.

In the core network node 2210 described in FIG. 22, the access network node sends the identifier of the terminal to the core network node by node using the second S1 interface application protocol message or the second NG interface application protocol message. The core network node may notify, by using the third S1 interface application protocol message or the third NG interface application protocol message, the access network node whether the terminal supports only control plane cellular internet of things or whether the terminal supports user plane cellular internet of things.

An embodiment of this application further provides a chip. The chip includes at least one processor, a memory, and an interface circuit. The memory, the interface circuit, and the at least one processor are interconnected by a circuitry. The at least one processor stores a computer program. The computer program, when executed by the processor, implements the method procedure shown in the foregoing method embodiments.

An embodiment of this application further provides a computer-readable storage medium. The computer-readable storage medium stores a computer program. When the computer program runs on a network device or a terminal, the method procedure shown in the foregoing method embodiments is implemented.

An embodiment of this application further provides a computer program product. When the computer program product runs on a network device or a terminal, the method procedure shown in the foregoing method embodiments is implemented.

It should be understood that, the processor mentioned in embodiments of this application may be a central processing unit (CPU), or may be another general purpose processor, a digital signal processor (DSP), an application specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor or the like.

It may be further understood that the memory mentioned in embodiments of this application may be a volatile memory or a nonvolatile memory, or may include a volatile memory and a nonvolatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (RAM), used as an external cache. Through example but not limitative description, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM).

It should be noted that when the processor is a general-purpose processor, a DSP, an ASIC, an FPGA, or another programmable logic device, discrete gate or transistor logic device, or discrete hardware component, the memory (a storage module) is integrated into the processor.

It should be noted that the memory described in this specification is intended to include but not limited to these memories and any memory of another appropriate type.

It should be understood that in the various embodiments of this application, sequence numbers of the foregoing processes do not mean execution sequences in embodiments of this application. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In several embodiments provided in this application, it should be understood that the disclosed system, apparatus, and method may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes: any medium that can store program code, such as a USB flash drive, a removable hard disk, a read-only memory (ROM), a random access memory (RAM), a magnetic disk, or an optical disc.

A sequence of the steps of the method in embodiments of this application may be adjusted, combined, or removed based on an actual requirement. In addition, for terms, explanations, and descriptions in embodiments of this application, reference may be made to corresponding descriptions in other embodiments.

The modules in the apparatus in embodiments of this application may be combined, divided, and deleted based on an actual requirement.

In summary, the foregoing embodiments are merely intended for describing the technical solutions of this application, but not for limiting this application. Although this application is described in detail with reference to the foregoing embodiments, a person of ordinary skill in the art should understand that modifications to the technical solutions recorded in the foregoing embodiments or equivalent replacements to some technical features thereof may still be made, without departing from the scope of the technical solutions of embodiments of this application.

What is claimed is:

1. A method comprising:

receiving a first message from an access network node; and processing, in response to the first message, information about a last cell serving a terminal stored in the terminal, wherein the processing comprises: skipping updating the information about the last cell serving the terminal in response to the first message, wherein the first message comprises first indication information, and the first indication information indicates at least one of following: no connection to a core network node is established; the core network node is unaware of current access of the terminal; or the access network node does not send first data to the core network node.

2. The method according to claim 1, wherein the first indication information further indicates at least one of following: radio resource control connection reject; radio resource control connection failure; radio resource control connection release; no radio resource control connection is established; access failure; or access reject.

3. The method according to claim 1, wherein after processing the information about the last cell serving the terminal, the method further comprises:

when the terminal is located in a cell corresponding to the information about the last cell serving the terminal, monitoring a wake up signal in the cell, and receiving paging based on the wake up signal.

4. The method according to claim 1, wherein after processing the information about the last cell serving the terminal, the method further comprises:

when the terminal is located in a first cell comprising no cell corresponding to the information about the last cell serving the terminal, skipping monitoring a wake up signal.

5. The method according to claim 1, wherein the first message is a radio resource control release message.

6. A method, the method comprising:

sending a first message to a terminal to cause the terminal to process information about a last cell serving the terminal stored in the terminal, wherein processing the information comprises:

skipping updating the information about the last cell serving the terminal in response to the first message, wherein the first message comprises first indication information, and the first indication information indicates at least one of following: no connection to a core network node is established; the core network node is unaware of current access of the terminal; or an access network node does not send first data to the core network node.

7. The method according to claim 6, wherein the first indication information further indicates at least one of following: radio resource control connection reject; radio resource control connection failure; radio resource control connection release; no radio resource control connection is established; access failure; or access reject.

8. The method according to claim 6, wherein after sending the first message to the terminal, the method further comprises:

receiving a paging message from the core network node, wherein the paging message comprises the information about the last cell serving the terminal; and using a wake up signal during paging of the terminal in a cell corresponding to the information about the last cell serving the terminal, wherein the wake up signal is to indicate the terminal to receive the paging.

9. The method according to claim 6, wherein after sending the first message to the terminal, the method further comprises:

receiving a paging message from the core network node, wherein the paging message comprises the information about the last cell serving the terminal; and skipping using a wake up signal during paging of the terminal in a first cell comprising no cell corresponding to the information about the last cell serving the terminal, wherein the wake up signal is to indicate the terminal to receive the paging.

10. The method according to claim 6, wherein the first message is a radio resource control release message.

11. An apparatus, the apparatus comprising:

at least one processor; and at least one non-transitory memory coupled to the at least one processor and storing instructions that, when the instructions are performed by the at least one processor, cause the apparatus to:

receive a first message from an access network node; and process, in response to the first message, information about a last cell serving a terminal stored in the terminal, wherein the processing comprises:

skipping updating the information about the last cell serving the terminal in response to the first message, wherein the first message comprises first indication information, and the first indication information indicates at least one of following: no connection to a core network node is established; the core network node is unaware of current access of the terminal; or the access network node does not send first data to the core network node.

12. The apparatus according to claim 11, wherein the first indication information further indicates at least one of following: radio resource control connection reject; radio resource control connection failure; radio resource control connection release; no radio resource control connection is established; access failure; or access reject.

13. The apparatus according to claim 11, wherein the apparatus is further caused to:

after processing the information about the last cell serving the terminal, and when the terminal is located in a cell corresponding to the information about the last cell serving the terminal, monitor a wake up signal in the cell, and receive paging based on the wake up signal.

14. The apparatus according to claim 11, wherein the apparatus is further caused to:

after processing the information about the last cell serving the terminal, and when the terminal is located in a first cell comprising no cell corresponding to the information about the last cell serving the terminal, skip monitoring a wake up signal.

15. The apparatus according to claim 11, wherein the first message is a radio resource control release message.

16. An apparatus, the apparatus comprising:

at least one processor; and at least one non-transitory memory coupled to the at least one processor and storing instructions that, when the instructions are executed by the at least one processor, cause the apparatus to:

determine a first message that causes a terminal to perform:

processing information about a last cell serving the terminal stored in the terminal, wherein the processing comprises:

skipping updating the information about the last cell serving the terminal in response to the first message; and send the first message to the terminal, wherein the first message comprises first indication information, and the first indication information indicates at least one of following: no connection to a core network node is established; the core network node is unaware of current access of the terminal; or an access network node does not send first data to the core network node.

17. The apparatus according to claim 16, wherein the first indication information further indicates at least one of following: radio resource control connection reject; radio resource control connection failure; radio resource control connection release; no radio resource control connection is established; access failure; or access reject.

18. The apparatus according to claim 16, wherein the apparatus is further caused to:

receive a paging message from the core network node, wherein the paging message comprises the information about the last cell serving the terminal; and use a wake up signal during paging of the terminal in a cell corresponding to the information about the last cell serving the terminal, wherein the wake up signal is to indicate the terminal to receive the paging.

19. The apparatus according to claim 16, wherein the apparatus is further caused to:

receive a paging message from the core network node, wherein the paging message comprises the information about the last cell serving the terminal; and skip using a wake up signal during paging of the terminal in a first cell comprising no cell corresponding to the information about the last cell serving the terminal, wherein the wake up signal is to indicate the terminal to receive the paging.

20. The apparatus according to claim 16, wherein the first message is a radio resource control release message.

* * * * *